(12) United States Patent
Cappello et al.

(10) Patent No.: US 11,747,897 B2
(45) Date of Patent: Sep. 5, 2023

(54) DATA PROCESSING APPARATUS AND METHOD OF USING GAZE DATA TO GENERATE IMAGES

(71) Applicant: Sony Interactive Entertainment Inc., Tokyo (JP)

(72) Inventors: Fabio Cappello, London (GB); Maria Chiara Monti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/360,215

(22) Filed: Jun. 28, 2021

(65) Prior Publication Data

US 2022/0004253 A1 Jan. 6, 2022

(30) Foreign Application Priority Data

Jul. 3, 2020 (GB) ...................................... 2010212

(51) Int. Cl.
*G06F 3/01* (2006.01)
*G02B 27/00* (2006.01)
(Continued)

(52) U.S. Cl.
CPC ......... *G06F 3/013* (2013.01); *G02B 27/0093* (2013.01); *G02B 27/017* (2013.01);
(Continued)

(58) Field of Classification Search
CPC ... G06F 3/013; G02B 27/0093; G02B 27/017; G06T 13/40; G06T 19/006; G06T 19/20
See application file for complete search history.

(56) References Cited

U.S. PATENT DOCUMENTS 10,228,760 B1 * 3/2019 Ross ........................ G06T 19/20
10,289,193 B2 * 5/2019 Hardy ...................... G06F 3/011
(Continued)

OTHER PUBLICATIONS

Combined Search and Examination Report for corresponding GB Application No. GB2010212 5, 11 pages, dated Mar. 26, 2021.
(Continued)

*Primary Examiner* — Stephen G Sherman
(74) *Attorney, Agent, or Firm* — Matthew B. Dernier, Esq.

(57) ABSTRACT

A data processing apparatus includes avatar monitoring circuitry to receive gaze data for a first user associated with a first avatar in a virtual reality environment, the gaze data for the first user indicative of a gaze point for the first user with respect to the virtual reality environment, in which the avatar monitoring circuitry is configured to select one or more objects in the virtual reality environment in dependence upon the gaze data for the first user and to store first avatar information for the first avatar indicative of one or more of the selected objects, input circuitry to receive gaze data for a second user indicative of a gaze point for the second user with respect to the virtual reality environment, and processing circuitry to generate one or more images for the virtual reality environment for display to the second user, in which the processing circuitry is configured to: select the first avatar in dependence upon the gaze point for the second user with respect to the first avatar; and generate the one or more images to include at least one graphical element indicative of the first avatar information in response to the selection of the first avatar.

20 Claims, 8 Drawing Sheets

(51) Int. Cl.
G02B 27/01 (2006.01)
G06T 13/40 (2011.01)
G06T 19/00 (2011.01)
G06T 19/20 (2011.01)

(52) U.S. Cl.
CPC ............ *G06T 13/40* (2013.01); *G06T 19/006* (2013.01); *G06T 19/20* (2013.01)

(56) References Cited

U.S. PATENT DOCUMENTS

| | | | |
|---|---|---|---|
| 10,701,426 | B1 | 6/2020 | van Hoff |
| 11,094,127 | B2 * | 8/2021 | McCall ................. A63F 13/428 |
| 2015/0235434 | A1 * | 8/2015 | Miller ..................... H04L 67/38 |
| | | | 345/633 |
| 2017/0358141 | A1 | 12/2017 | Stafford |
| 2018/0005429 | A1 | 1/2018 | Osman |

OTHER PUBLICATIONS

Extended European Search Report for corresponding EP Application No. 201180799.5, 10 pages, dated Nov. 8, 2021.

* cited by examiner

DATA PROCESSING APPARATUS AND METHOD OF USING GAZE DATA TO GENERATE IMAGES

BACKGROUND OF THE INVENTION

Field of the Invention

The present disclosure relates to apparatus and methods. In particular, the present disclosure relates to data processing apparatus and methods that use gaze data from gaze tracking systems to generate one or more images.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Gaze tracking systems are used to identify a location of a subject's gaze within an environment; in many cases, this location may be a position on a display screen that is being viewed by the subject. In a number of existing arrangements, this is performed using one or more inwards-facing cameras directed towards the subject's eye (or eyes) in order to determine a direction in which the eyes are oriented at any given time. Having identified the orientation of the eye, a gaze direction can be determined and a focal region may be determined as the intersection of the gaze direction of each eye.

One application for which gaze tracking is considered of particular use is that of use in head-mountable display units (HMDs). The use in HMDs may be of particular benefit owing to the close proximity of inward-facing cameras to the user's eyes, allowing the tracking to be performed much more accurately and precisely than in arrangements in which it is not possibly to provide the cameras with such proximity.

By utilising gaze detection techniques, it may be possible to provide a more efficient and/or effective processing method for generating content or interacting with devices.

For example, gaze tracking may be used to provide user inputs or to assist with such inputs—a continued gaze at a location may act as a selection, or a gaze towards a particular object accompanied by another input (such as a button press) may be considered as a suitable input. This may be more effective as an input method in some embodiments, particularly in those in which a controller is not provided or when a user has limited mobility.

Foveal rendering is an example of a use for the results of a gaze tracking process in order to improve the efficiency of a content generation process. Foveal rendering is rendering that is performed so as to exploit the fact that human vision is only able to identify high detail in a narrow region (the fovea), with the ability to discern detail tailing off sharply outside of this region.

In such methods, a portion of the display is identified as being an area of focus in accordance with the user's gaze direction. This portion of the display is supplied with high-quality image content, while the remaining areas of the display are provided with lower-quality (and therefore less resource intensive to generate) image content. This can lead to a more efficient use of available processing resources without a noticeable degradation of image quality for the user.

It is therefore considered advantageous to be able to improve gaze tracking methods, and/or apply the results of such methods in an improved manner. It is in the context of such advantages that the present disclosure arises.

SUMMARY OF THE INVENTION

Various aspects and features of the present invention are defined in the appended claims and within the text of the accompanying description.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
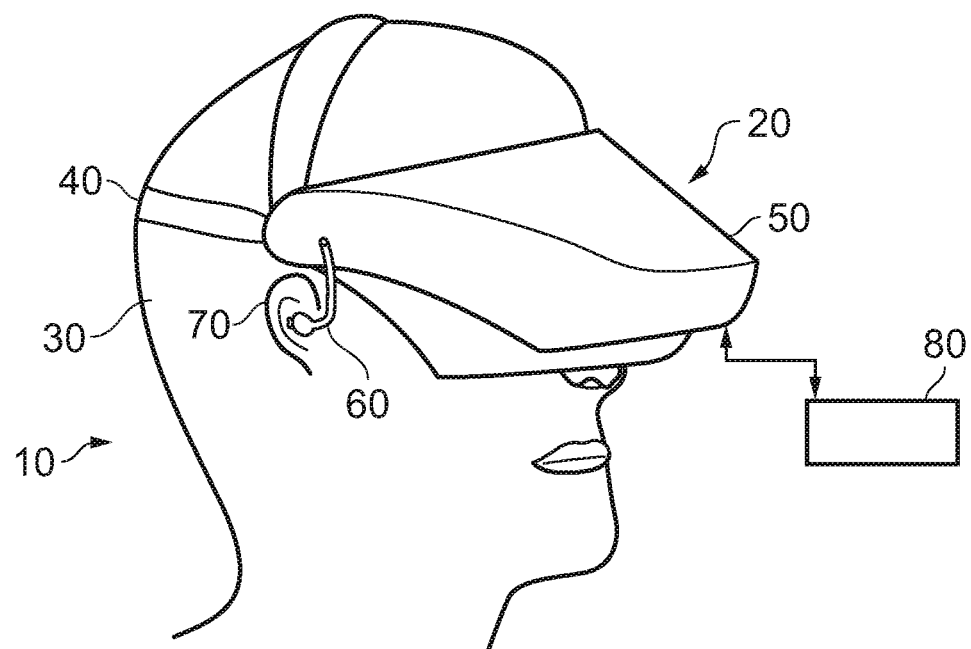
FIG. 1 schematically illustrates an HMD worn by a user.

Referring now to the drawings, wherein like reference numerals designate identical or corresponding parts throughout the several views, in FIG. 1 a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth® transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply 83 (including one or more batteries and/or being connectable to a mains power outlet) may be linked by a cable to the HMD. Note that the power supply 83 and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element (display unit) mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
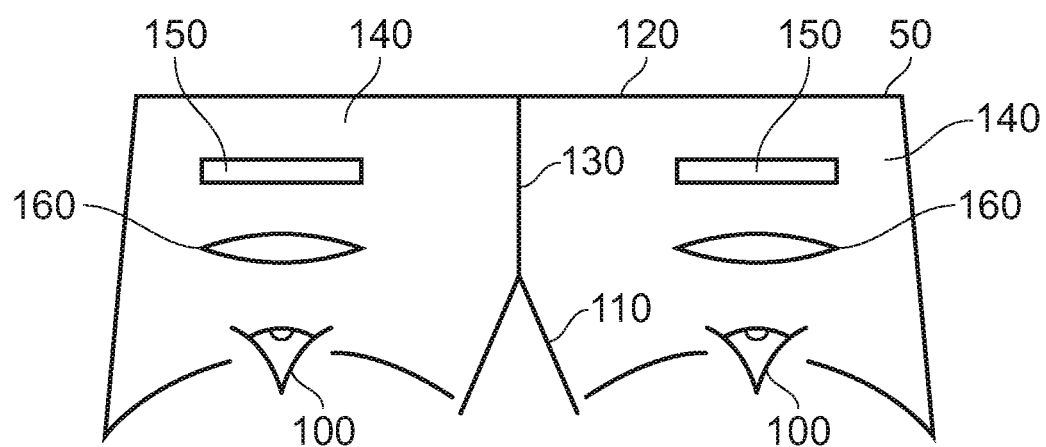
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element (display unit) 150 and one or more optical elements 160. The way in which the display element and the optical element(s) cooperate to provide a display to the user will be described with reference to FIG. 3.

Figure 3:
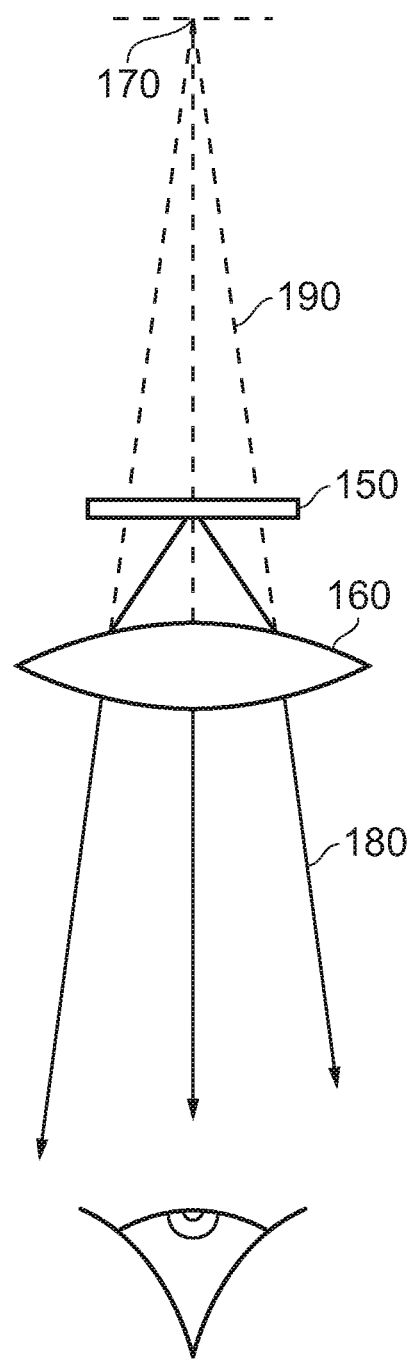
FIG. 3 schematically illustrates the formation of a virtual image by an HMD.

Referring to FIG. 3, the display element (display unit) 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150. As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
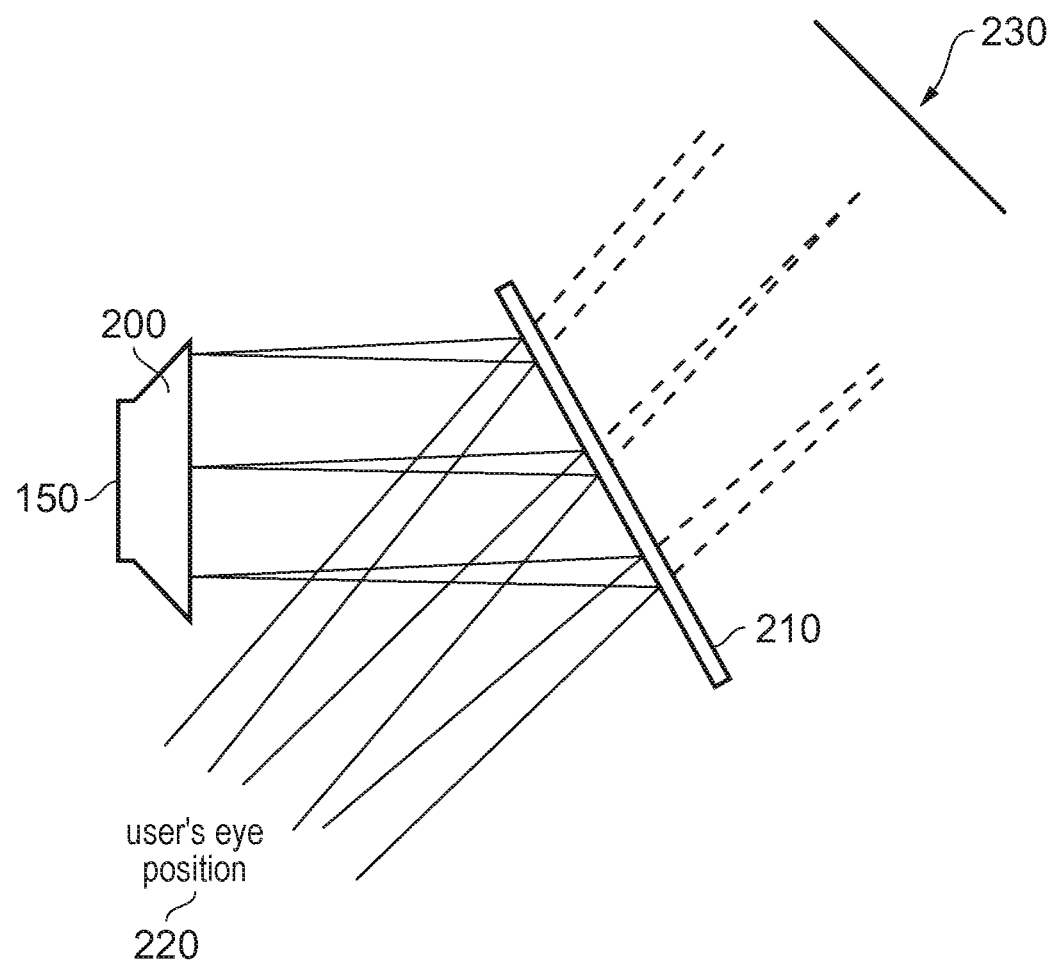
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element (display unit) 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

Turning to gaze tracking in such an arrangement, FIG. 6 schematically illustrates two possible arrangements for performing eye tracking on an HMD. The cameras provided within such arrangements may be selected freely so as to be able to perform an effective eye-tracking method. In some existing arrangements, visible light cameras are used to capture images of a user's eyes. Alternatively, infra-red (IR) cameras are used so as to reduce interference either in the captured signals or with the user's vision should a corresponding light source be provided, or to improve performance in low-light conditions.

Figure 6A:
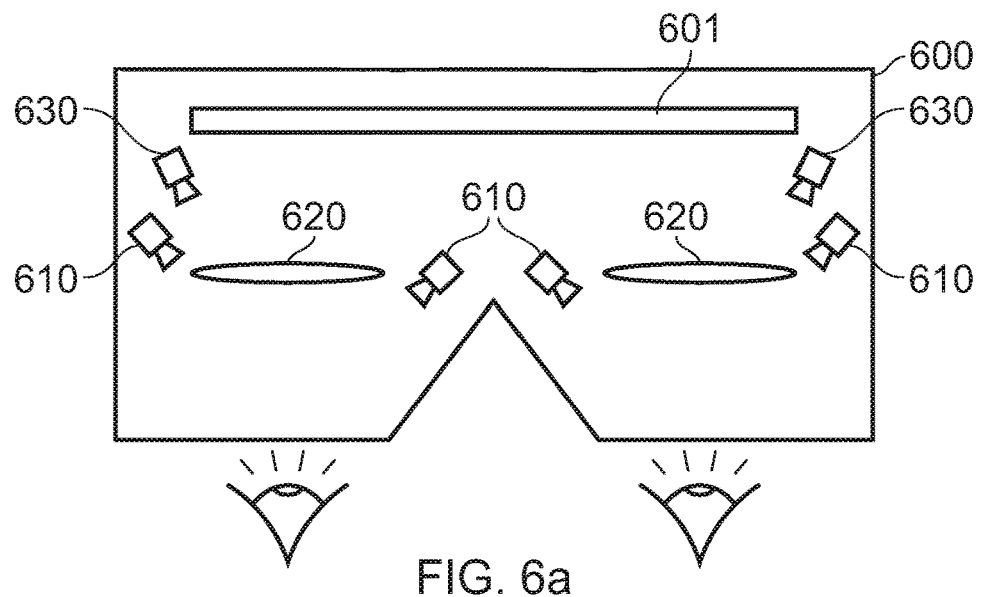
FIG. 6a schematically illustrates a plan view of an HMD.

FIG. 6a shows an example of a gaze tracking arrangement in which the cameras are arranged within an HMD so as to capture images of the user's eyes from a short distance. This may be referred to as near-eye tracking, or head-mounted tracking.

In this example, an HMD 600 with a display element (display unit) 601 is provided with cameras 610 that are each arranged so as to directly capture one or more images of a respective one of the user's eyes using an optical path that does not include the lens 620. This may be advantageous in that distortion in the captured image due to the optical effect of the lens is able to be avoided. Four cameras 610 are shown here as examples of possible positions that eye-tracking cameras may provided, although it should be considered that any number of cameras may be provided in any suitable location so as to be able to image the corresponding eye effectively. For example, only one camera may be provided per eye or more than two cameras may be provided for each eye.

However it is considered that in a number of embodiments it is advantageous that the cameras are instead arranged so as to include the lens 620 in the optical path used to capture images of the eye. Examples of such positions are shown by the cameras 630. While this may result in processing being required to enable suitably accurate tracking to be performed, due to the deformation in the captured image due to the lens, this may be performed relatively simply due to the fixed relative positions of the corresponding cameras and lenses. An advantage of including the lens within the optical path may be that of simplifying the physical constraints upon the design of an HMD, for example.

Figure 6B:
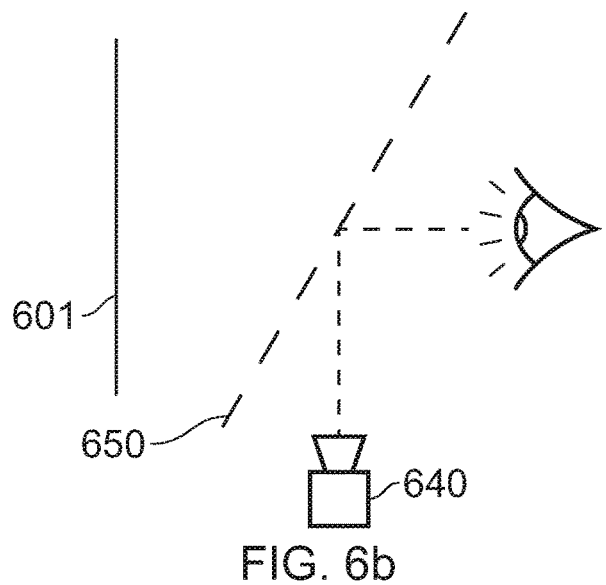
FIG. 6b schematically illustrates a near-eye tracking arrangement.

FIG. 6b shows an example of a gaze tracking arrangement in which the cameras are instead arranged so as to indirectly capture images of the user's eyes. Such an arrangement may be particularly suited to use with IR or otherwise non-visible light sources, as will be apparent from the below description.

FIG. 6b includes a mirror 650 arranged between a display 601 and the viewer's eye (of course, this can be extended to or duplicated at the user's other eye as appropriate). For the sake of clarity, any additional optics (such as lenses) are omitted in this Figure—it should be appreciated that they may be present at any suitable position within the depicted arrangement. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted.

Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display.

Figure 7:
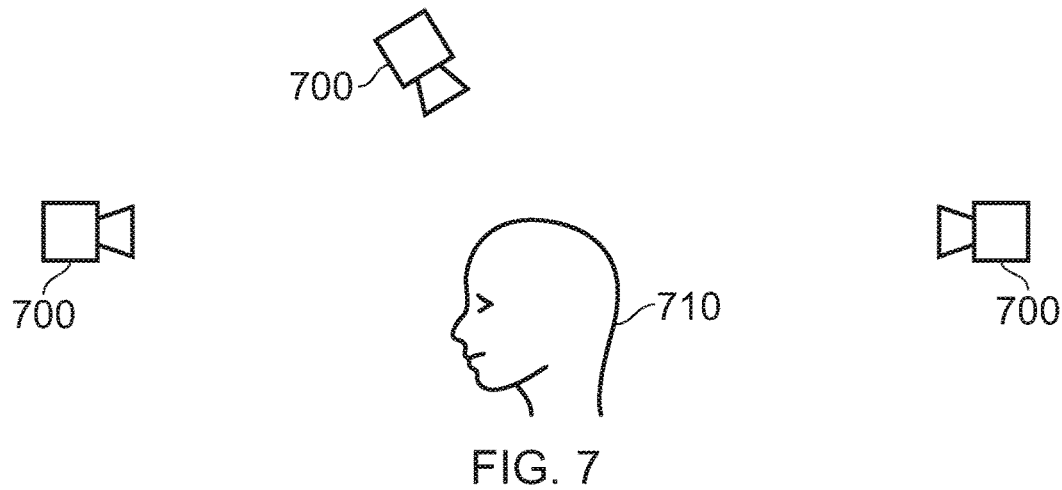
FIG. 7 schematically illustrates a remote tracking arrangement.

Of course, eye-tracking arrangements need not be implemented in a head-mounted or otherwise near-eye fashion as has been described above. For example, FIG. 7 schematically illustrates a system in which a camera is arranged to capture images of the user from a distance; this distance may vary during tracking, and may take any value in dependence upon the parameters of the tracking system. For example, this distance may be thirty centimetres, a metre, five metres, ten metres, or indeed any value so long as the tracking is not performed using an arrangement that is affixed to the user's head.

In FIG. 7, an array of cameras 700 is provided that together provide multiple views of the user 710. These cameras are configured to capture information identifying at least the direction in which a user's 710 eyes are focused, using any suitable method. For example, IR cameras may be utilised to identify reflections from the user's 710 eyes. An array of cameras 700 may be provided so as to provide multiple views of the user's 710 eyes at any given time, or may be provided so as to simply ensure that at any given time at least one camera 700 is able to view the user's 710 eyes. It is apparent that in some use cases it may not be necessary to provide such a high level of coverage and instead only one or two cameras 700 may be used to cover a smaller range of possible viewing directions of the user 710.

Of course, the technical difficulties associated with such a long-distance tracking method may be increased; higher resolution cameras may be required, as may stronger light sources for generating IR light, and further information (such as head orientation of the user) may need to be input to determine a focus of the user's gaze. The specifics of the arrangement may be determined in dependence upon a required level of robustness, accuracy, size, and/or cost, for example, or any other design consideration.

Despite technical challenges including those discussed above, such tracking methods may be considered beneficial in that they allow a greater range of interactions for a user—rather than being limited to HMD viewing, gaze tracking may be performed for a viewer of a television, for instance.

Rather than varying only in the location in which cameras are provided, eye-tracking arrangements may also differ in where the processing of the captured image data to determine tracking data is performed.

Figure 8:
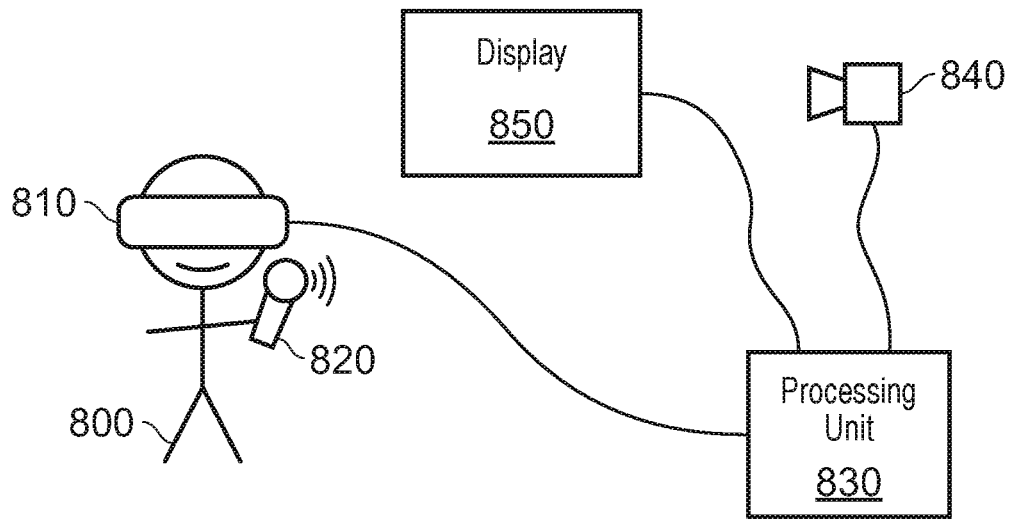
FIG. 8 schematically illustrates a gaze tracking environment.

FIG. 8 schematically illustrates an environment in which an eye-tracking process may be performed. In this example, the user 800 is using an HMD 810 that is associated with the processing unit 830, such as a games console, with the peripheral 820 allowing a user 800 to input commands to control the processing. The HMD 810 may perform eye tracking in line with an arrangement exemplified by FIG. 6a or 6b, for example—that is, the HMD 810 may comprise one or more cameras operable to capture images of either or both of the user's 800 eyes. The processing unit 830 may be operable to generate content for display at the HMD 810; although some (or all) of the content generation may be performed by processing units within the HMD 810.

The arrangement in FIG. 8 also comprises a camera 840, located outside of the HMD 810, and a display 850. In some cases, the camera 840 may be used for performing tracking of the user 800 while using the HMD 810, for example to identify body motion or a head orientation. The camera 840 and display 850 may be provided as well as or instead of the HMD 810; for example these may be used to capture images of a second user and to display images to that user while the first user 800 uses the HMD 810, or the first user 800 may be tracked and view content with these elements instead of the HMD 810. That is to say, the display 850 may be operable to display generated content provided by the processing unit 830 and the camera 840 may be operable to capture images of one or more users' eyes to enable eye-tracking to be performed.

While the connections shown in FIG. 8 are shown by lines, this should of course not be taken to mean that the connections should be wired; any suitable connection method, including wireless connections such as wireless networks or Bluetooth®, may be considered suitable. Similarly, while a dedicated processing unit 830 is shown in FIG. 8 it is also considered that the processing may in some embodiments be performed in a distributed manner—such as using a combination of two or more of the HMD 810, one or more processing units, remote servers (cloud processing), or games consoles.

The processing required to generate tracking information from captured images of the user's 800 eye or eyes may be performed locally by the HMD 810, or the captured images or results of one or more detections may be transmitted to an external device (such as a the processing unit 830) for processing. In the former case, the HMD 810 may output the results of the processing to an external device for use in an image generation process if such processing is not performed exclusively at the HMD 810. In embodiments in which the HMD 810 is not present, captured images from the camera 840 are output to the processing unit 830 for processing.

Figure 9:
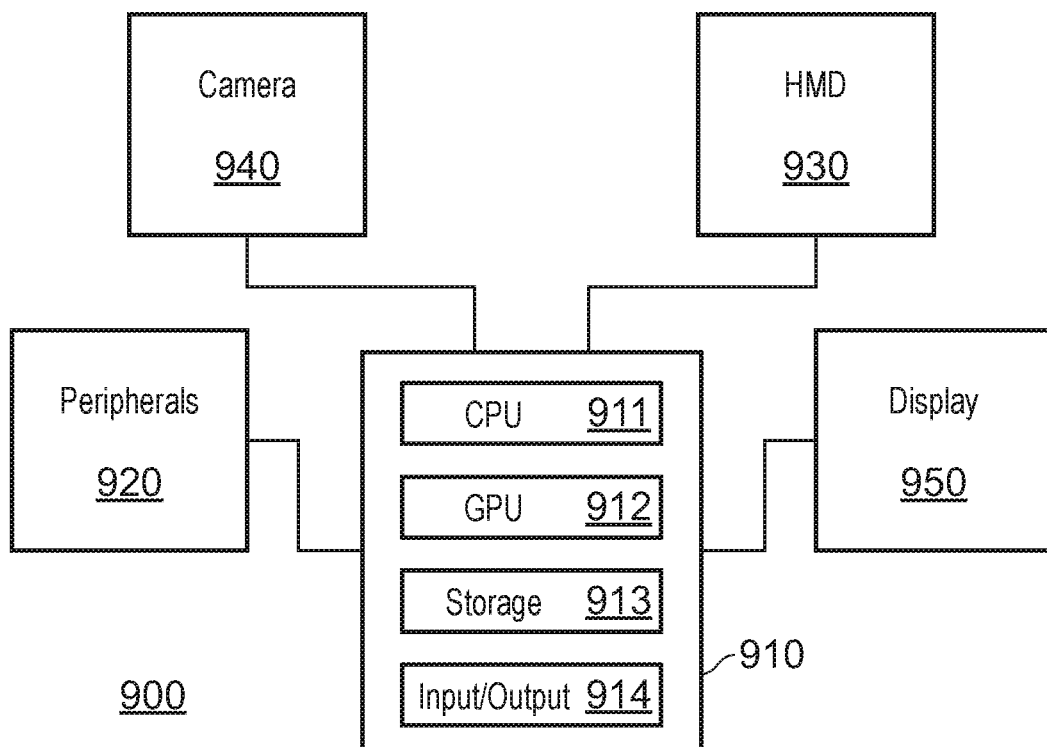
FIG. 9 schematically illustrates a gaze tracking system.

FIG. 9 schematically illustrates a system for performing one or more eye tracking processes, for example in an embodiment such as that discussed above with reference to FIG. 8. The system 900 comprises a processing device 910, one or more peripherals 920, an HMD 930, a camera 940, and a display 950. Of course, not all elements need be present within the system 900 in a number of embodiments—for instance, if the HMD 930 is present then it is considered that the camera 940 may be omitted as it is unlikely to be able to capture images of the user's eyes.

As shown in FIG. 9, the processing device 910 may comprise one or more of a central processing unit (CPU) 911, a graphics processing unit (GPU) 912, storage (such as a hard drive, or any other suitable data storage medium) 913, and an input/output 914. These units may be provided in the form of a personal computer, a games console, or any other suitable processing device.

For example, the CPU 911 may be configured to generate tracking data from one or more input images of the user's eyes from one or more cameras, or from data that is indicative of a user's eye direction. This may be data that is obtained from processing images of the user's eye at a remote device, for example. Of course, should the tracking data be generated elsewhere then such processing would not be necessary at the processing device 910.

The GPU 912 may be configured to generate content for display to the user on which the eye tracking is being performed. In some embodiments, the content itself may be modified in dependence upon the tracking data that is obtained—an example of this is the generation of content in accordance with a foveal rendering technique. Of course, such content generation processes may be performed elsewhere—for example, an HMD 930 may have an on-board GPU that is operable to generate content in dependence upon the eye tracking data.

The storage 913 may be provided so as to store any suitable information. Examples of such information include program data, content generation data, and eye tracking model data. In some cases, such information may be stored remotely such as on a server, and as such a local storage 913 may not be required—the discussion of the storage 913 should therefore be considered to refer to local (and in some cases removable storage media) or remote storage.

The input/output 914 may be configured to perform any suitable communication as appropriate for the processing device 910. Examples of such communication include the transmission of content to the HMD 930 and/or display 950, the reception of eye-tracking data and/or images from the HMD 930 and/or the camera 940, and communication with one or more remote servers (for example, via the internet).

As discussed above, the peripherals 920 may be provided to allow a user to provide inputs to the processing device 910 in order to control processing or otherwise interact with generated content. This may be in the form of button presses or the like, or alternatively via tracked motion to enable gestures to be used as inputs.

The HMD 930 may comprise a number of sub-elements, which have been omitted from FIG. 9 for the sake of clarity. Of course, the HMD 930 should comprise a display unit operable to display images to a user. In addition to this, the HMD 930 may comprise any number of suitable cameras for eye tracking (as discussed above), in addition to one or more processing units that are operable to generate content for display and/or generate eye tracking data from the captured images.

The camera 940 and display 950 may be configured in accordance with the discussion of the corresponding elements above with respect to FIG. 8.

Turning to the image capture process upon which the eye tracking is based, examples of different cameras are discussed. The first of these is a standard camera, which captures a sequence of images of the eye that may be processed to determine tracking information. The second is that of an event camera, which instead generates outputs in accordance with observed changes in brightness.

It is more common to use standard cameras in such tracking arrangements, given that they are widely available and often relatively cheap to produce. 'Standard cameras' here refer to cameras which capture images of the environment at predetermined intervals which can be combined to generate video content. For example, a typical camera of this type may capture thirty images (frames) each second, and these images may be output to a processing unit for feature detection or the like to be performed so as to enable tracking of the eye.

Such a camera comprises a light-sensitive array that is operable to record light information during an exposure time, with the exposure time being controlled by a shutter speed (the speed of which dictates the frequency of image capture). The shutter may be configured as a rolling shutter (line-by-line reading of the captured information) or a global shutter (reading the captured information of the whole frame simultaneously), for example.

However, in some arrangements it may be considered advantageous to instead use an event camera, which may also be referred to as a dynamic vision sensor. Such cameras do not require a shutter as described above, and instead each element of the light-sensitive array (often referred to as a pixel) is configured to output a signal at any time a threshold brightness change is observed. This means that images are not output in the traditional sense—however an image reconstruction algorithm may be applied that is able to generate an image from the signals output by an event camera.

While there is an increased computational complexity for generating an image from such data, the output of the event camera can be used for tracking without any image generation. One example of how this is performed is that of using an IR-sensitive event camera; when imaged using IR light, the pupil of the human eye displays a much higher level of brightness than the surrounding features. By selecting an appropriate threshold brightness, the motion of the pupil would be expected to trigger events (and corresponding outputs) at the sensor.

Independent of the type of camera that is selected, in many cases it may be advantageous to provide illumination to the eye in order to obtain a suitable image. One example of this is the provision of an IR light source that is configured to emit light in the direction of one or both of the user's eyes; an IR camera may then be provided that is able to detect reflections from the user's eye in order to generate an image. IR light may be preferable as it is invisible to the human eye, and as such does not interfere with normal viewing of content by the user, but it is not considered to be essential. In some cases, the illumination may be provided by a light source that is affixed to the imaging device, while in other embodiments it may instead be that the light source is arranged away from the imaging device.

Figure 10:
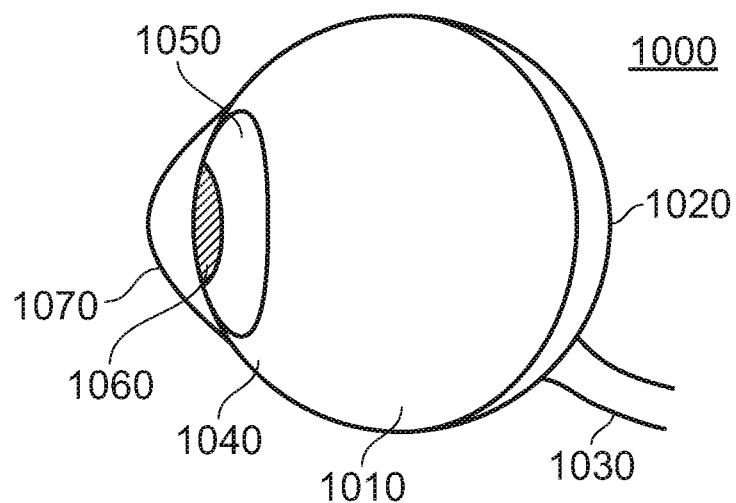
FIG. 10 schematically illustrates a human eye.

As suggested in the discussion above, the human eye does not have a uniform structure; that is, the eye is not a perfect sphere, and different parts of the eye have different characteristics (such as varying reflectance or colour). FIG. 10 shows a simplified side view of the structure of a typical eye 1000; this Figure has omitted features such as the muscles which control eye motion for the sake of clarity.

The eye 1000 is formed of a near-spherical structure filled with an aqueous solution 1010, with a retina 1020 formed on the rear surface of the eye 1000. The optic nerve 1030 is connected at the rear of the eye 1000. Images are formed on the retina 1020 by light entering the eye 1000, and corresponding signals carrying visual information are transmitted from the retina 1020 to the brain via the optic nerve 1030.

Turning to the front surface of the eye 1000, the sclera 1040 (commonly referred to as the white of the eye) surrounds the iris 1050. The iris 1050 controls the size of the pupil 1060, which is an aperture through which light enters the eye 1000. The iris 1050 and pupil 1060 are covered by the cornea 1070, which is a transparent layer which can refract light entering the eye 1000. The eye 1000 also comprises a lens (not shown) that is present behind the iris 1050 that may be controlled to adjust the focus of the light entering the eye 1000.

Figure 11:
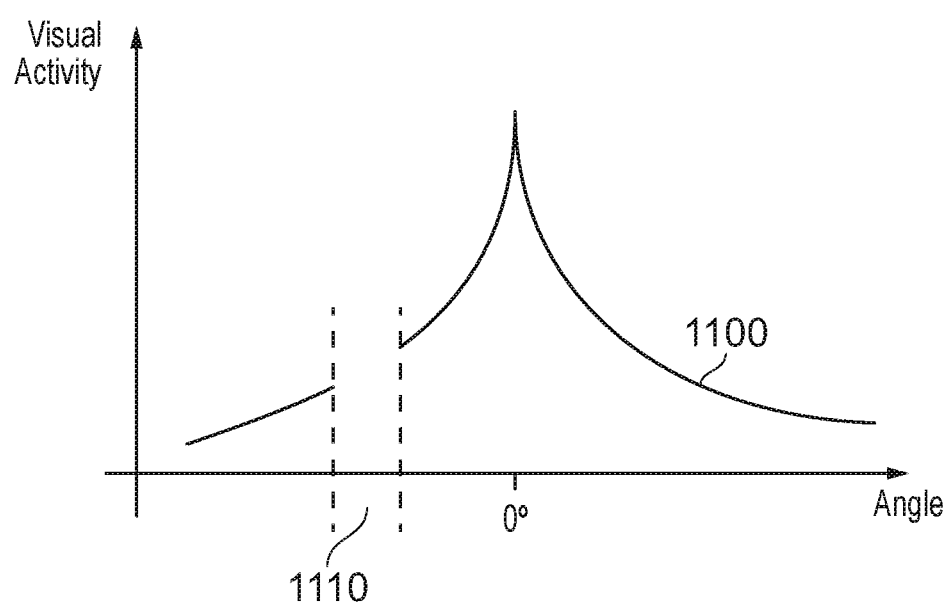
FIG. 11 schematically illustrates a graph of human visual acuity.

The structure of the eye is such that there is an area of high visual acuity (the fovea), with a sharp drop off either side of this. This is illustrated by the curve 1100 of FIG. 11, with the peak in the centre representing the foveal region. The area 1110 is the 'blind spot'; this is an area in which the eye has no visual acuity as it corresponds to the area where the optic nerve meets the retina. The periphery (that is, the viewing angles furthest from the fovea) is not particularly sensitive colour or detail, and instead is used to detect motion.

As has been discussed above, foveal rendering is a rendering technique that takes advantage of the relatively small size (around 2.5 degrees) of the fovea and the sharp fall-off in acuity outside of that.

The eye undergoes a large amount of motion during viewing, and this motion may be categorised into one of a number of categories.

A saccadic eye movement is identified as a fast motion of the eye in which the eye moves in a ballistic manner to change a point of fixation. A saccadic eye movement may be considered as being a ballistic movement, in that once the movement of the eye has been initiated to change a point of focus from a current point of focus to a target point of focus (next point of focus), the target point of focus and the direction of movement of the eye to move the point of focus to the target point of focus cannot be altered by the human visual system. Therefore at the time of initiation of the saccadic eye movement, the eye movements to be performed have already been determined and are thus said to be predetermined. During the course of the eye movement to change from the current fixation point to the next fixation point it is not possible to interrupt the eye movement, and upon reaching the target fixation point the eye remains stationary for a period of time (a fixation pause) to focus on the target fixation point before subsequent eye movement can be initiated.

It is sometimes observed that a saccade is followed by a smaller corrective saccade that is performed to bring the eye closer to the target fixation point. Such a corrective saccade typically occurs after a short period of time. As such, saccades can range in size from a small eye movement such as a corrective saccade or a small eye movement made while reading text, for example, to a much larger eye movement made when observing a surrounding environment. Saccades performed when reading text are voluntarily initiated by the human visual system, whereas when surveying a surrounding environment or viewing an image on a display unit saccades are often performed reflexively to focus on a target. Saccades may have a duration of up to approximately two hundred milliseconds, depending on a size of the angle rotated by the eye to change the position of the foveal region of the viewer's vision, but may have a duration as short as twenty milliseconds. Typical rotational velocities for a saccadic eye movement may range from fifty up to seven hundred degrees per second. The rotational velocity of the eye during a saccadic eye movement and the magnitude of the total rotation angle have a relationship in that larger rotational velocities are observed for larger rotation angles.

'Smooth pursuit' refers to a slower movement type than a saccade. Smooth pursuit is generally associated with a conscious tracking of a point of focus by a viewer, and is performed so as to maintain the position of a target within (or at least substantially within) the foveal region of the viewer's vision. This enables a high-quality view of a target of interest to be maintained in spite of motion. If the target moves too fast, then smooth pursuit may instead require a number of saccades in order to keep up; this is because smooth pursuit has a lower maximum speed, in the region of thirty degrees per second.

The vestibular-ocular reflex is a further example of eye motion. The vestibular-ocular reflex is the motion of the eyes that counteracts head motion; that is, the motion of the eyes relative to the head that enables a person to remain focused on a particular point despite moving their head.

Another type of motion is that of the vergence accommodation reflex. This is the motion that causes the eyes to rotate to converge at a point, and the corresponding adjustment of the lens within the eye to cause that point to come into focus.

Further eye motions that may be observed as a part of a gaze tracking process are those of blinks or winks, in which the eyelid covers the eyes of the user.

As discussed previously, a display unit (such as the display unit 150, 601) can be provided as part of the HMD and configured to display images to the user wearing the HMD. Whilst viewing images displayed by the HMD, movements of the eye are performed by a user wearing the HMD to move the fovea and enable detailed visual analysis of a portion of an image displayed by the HMD, and such movements can be tracked by a camera and/or an event camera provided as part of the HMD. Similarly, a display unit (such as the display unit 850) can be configured to display images to a user not wearing an HMD, and a camera and/or an event camera mounted with respect to the display unit 850 so that the user is included within the field-of-view can be used to track the movements of the user's eye(s). The camera can thus be configured to capture images of the user to track the eye movements of the user while viewing the display unit. Therefore, for a given content displayed to a user, the user's eye movements can be detected and corresponding gaze data indicative of the user's gaze point with respect to the content and/or the display unit displaying the content can be output.

Image-based gaze tracking techniques can be implemented using one or more cameras (and/or one or more infra-red cameras) comprising an image sensor configured to capture respective image frames at a fixed frame rate specified by a system clock (e.g. 30 frames per second). Features associated with an eye can be identified in each image frame and the positions of the features can be tracked across multiple image frames to track the user's gaze direction. The camera can thus be configured output gaze data for a user indicative of a gaze point for the user. For example, gaze tracking techniques may rely on identifying a corneal reflection and a pupil as features to track, such that a point of gaze (where the user is looking) can be calculated at fixed time intervals according to the tracked positions of these features in the image frames. In some examples, image-based gaze tracking techniques may be implemented using one or more event-cameras configured to detect events in response to changes in light incident upon an image sensor from the eye of the user. The event-camera comprises a plurality of sensor elements each capable of operating independently of the other sensor elements such that each sensor element is configured to detect an event and output a signal in response to detecting an event. Therefore, the event-camera is capable of measuring changes in light on a per-sensor element basis and generating an output signal comprising events detected by the respective sensor elements in a manner such that the event-camera can detect changes in a scene asynchronously and independently for respective sensor elements. The event-camera can thus be configured output gaze data for a user indicative of a gaze point for the user. In some examples, the event-camera may be an infra-red (IR) sensitive event-camera such that an IR light source can be used to illuminate the eye. When imaged using IR light, the pupil of the human eye typically displays a much higher level of brightness than the surrounding features.

The operations to be discussed below relate to monitoring gaze data for a user associated with an avatar in a virtual reality environment and storing information indicative of one or more objects in the virtual reality environment that are identified as being observed by the user. A virtual reality environment typically comprises a number of graphical objects which may have a fixed position within the virtual reality environment (e.g. a virtual wall or a virtual tree) or a position that varies with respect to time as the object moves within the virtual reality environment (e.g. a virtual car or a virtual avatar). When observing images of a virtual reality environment (for example, when viewing images displayed by an HMD or when viewing images on a display unit such as the display unit 850 or 950), each user typically moves their eyes with respect to the display to focus on respective objects within the images representing the virtual reality environment. Gaze data for the user output by one or more gaze detectors (e.g. one or more cameras and/or one or more event cameras) can be monitored by a data processing apparatus to identify one or more objects within the virtual reality environment that are targeted by the user's gaze point. Information for one or more of the objects targeted by the user's gaze point can be stored in association with the user or the user's avatar. References herein to storing information (also referred to later as "avatar information") refer to storing information in association with a user (e.g. in association with a user profile or a user account) and/or in association with the user's avatar in the virtual reality environment. The avatar information may be stored by a user's device (such as a game console or personal computer) and/or stored by a server configured to communicate with one or more user devices so that avatar information may be shared between devices.

One or more images of the virtual reality environment including an avatar having associated avatar information can be generated for display to a second user, where the second user may also be associated with an avatar in the virtual reality environment or may be a spectator that views the virtual reality environment without having an associated avatar. References herein to a second user therefore refer to a user that views one or more images of the virtual reality environment (for example, when viewing images displayed by an HMD or when viewing images on a display unit such as the display unit 850 or 950), and optionally the second user may have a corresponding avatar in the virtual reality environment. In response to the second user directing their gaze point towards an avatar within the virtual reality environment, the one or more images for display to the second user can be generated to include one or more graphical elements for providing an indication of the information (avatar information) stored in association with the avatar that is targeted by the second user's gaze point, where the stored avatar information is indicative of one or more objects that have been viewed and/or are currently being viewed by the user associated with that avatar.

Figure 12A:
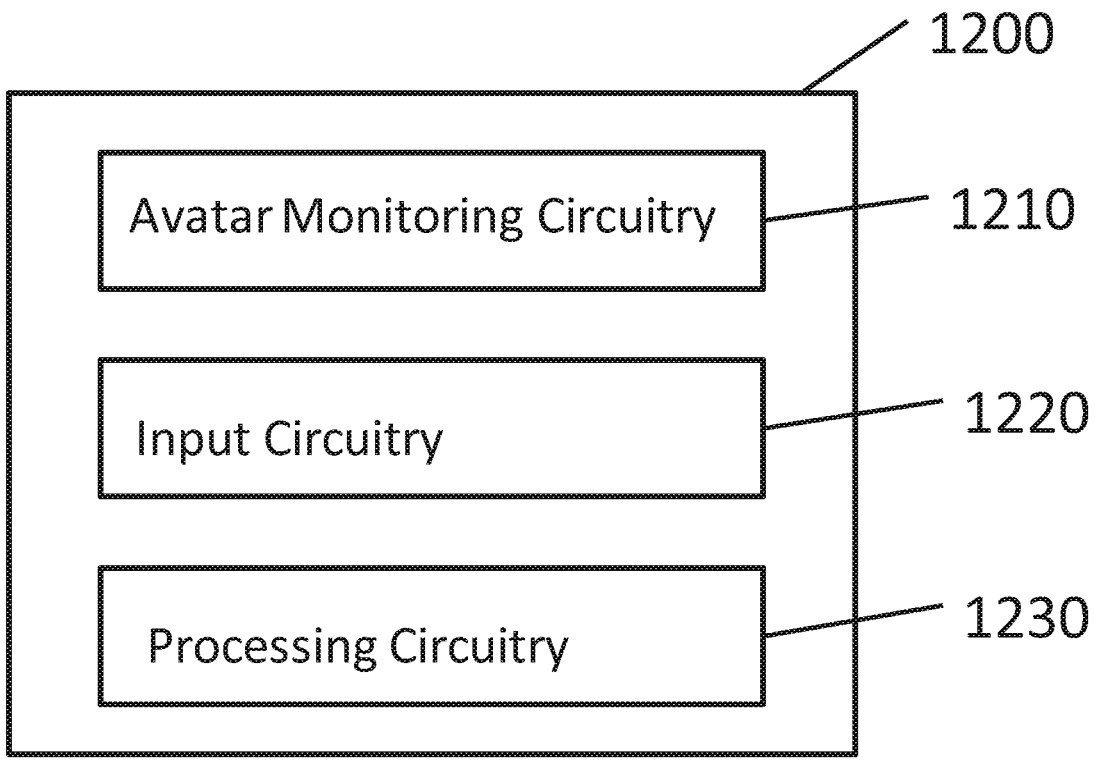
FIG. 12a schematically illustrates a data processing apparatus.

FIG. 12*a* schematically illustrates a data processing apparatus 1200 for generating one or more images for a virtual reality environment for display to the second user. In embodiments of the disclosure, the data processing apparatus 1200 comprises: avatar monitoring circuitry 1210 to receive gaze data for a first user associated with a first avatar in a virtual reality environment, the gaze data for the first user indicative of a gaze point for the first user with respect to the virtual reality environment, in which the avatar monitoring circuitry 1210 is configured to select one or more objects in the virtual reality environment in dependence upon the gaze data for the first user and to store first avatar information for the first avatar indicative of one or more of the selected objects; input circuitry 1220 to receive gaze data for the second user indicative of a gaze point for the second user with respect to the virtual reality environment; and processing circuitry 1230 to generate one or more images for the virtual reality environment for display to the second user, in which the processing circuitry 1230 is configured to: select the first avatar in dependence upon the gaze point for the second user with respect to the first avatar; and generate the one or more images to include at least one graphical element indicative of the first avatar information in response to the selection of the first avatar.

The data processing apparatus 1200 may be provided as part of a processing device, such as the processing device 910, or as part of a server. Alternatively, the data processing apparatus 1200 may be provided as part of an HMD configured to be worn by the second user. In some examples, the input circuitry 1220 and the processing circuitry 1230 may be provided as part of an HMD configured to be worn by the second user, and the avatar monitoring circuitry 1210 may be provided as part of a separate processing device (e.g. the processing device 910 or the server) configured to communicate with the HMD. In some examples, the input circuitry 1220 and the processing circuitry 1230 may be provided as part of a game console or a personal computer associated with the second user, and the avatar monitoring circuitry 1210 may be provided as part of a remote server configured to communicate with the game console or the personal computer.

The processing circuitry 1230 is configured to generate one or more images representing the virtual reality environment for display to the second user. The second user may be wearing an HMD, in which case the processing circuitry 1230 is configured to generate the one or more images for display to the user via the HMD. In some examples, the processing circuitry 1230 is configured to generate audio signals for the virtual reality environment in addition to generating the one or more images for the virtual reality environment. Hence more generally, the processing circuitry 1230 can be configured to generate audio and video content for the virtual reality environment for output to the second user. Alternatively, the user may be viewing a display unit (such as the display unit 850 or 950), in which case the processing circuitry 1230 is configured to generate the one or more images for display to the user via the display unit. Hence more generally, the processing circuitry 1230 can be configured to generate one or more images for display to the second user by at least one of a display unit (such as the display unit 850) and an HMD.

In some examples, the functionality of the processing circuitry 1230 may be performed in a distributed manner using a combination of processing devices (for example, a combination of processing performed by an HMD and a personal computer, or a personal computer and a server). References herein to images generated by the processing circuitry 1230 refer to generating either stereoscopic images for which left images and right images are displayed to the respective eyes or generating a single image that is displayed to both eyes.

Figure 12B:
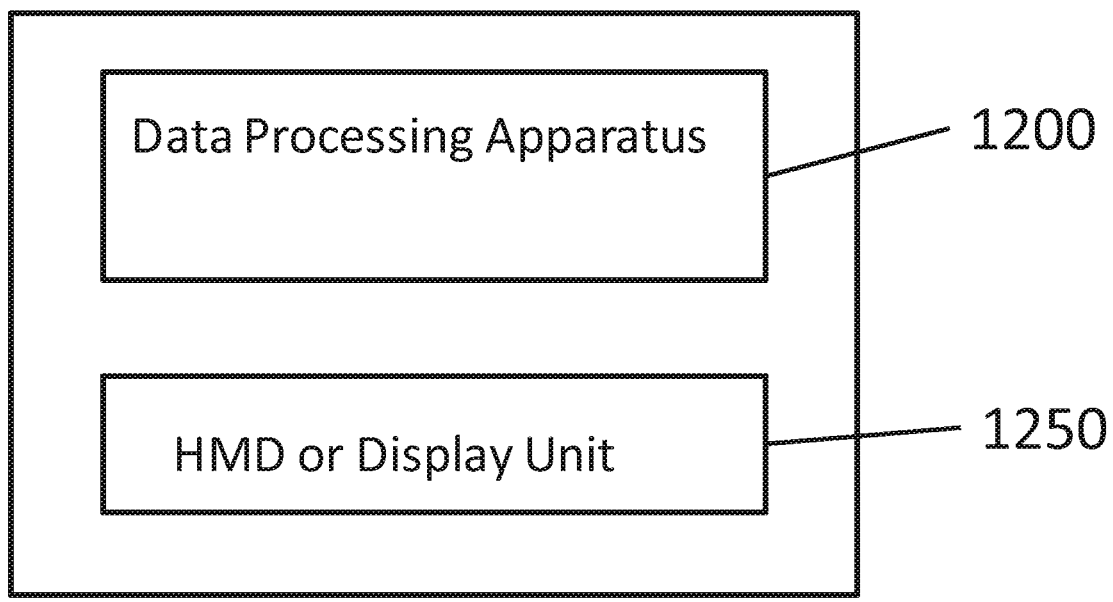
FIG. 12b schematically illustrates a system.

FIG. 12*b* schematically illustrates a system comprising: the data processing apparatus 1200; and one of an HMD 1250 and a display unit 850, 950 to output the one or more images generated by the data processing apparatus 1200 for display to the second user. In the system, the data processing apparatus 1200 may be provided as part of the second user's game console or personal computer. The HMD 1250 is configured to be worn by the second user and/or the display unit 850, 950 is arranged with respect to the second user so that an image displayed by the display unit 850, 950 is viewed by the second user. The data processing apparatus 1200 is configured to communicate with the HMD 1250 via a wireless (e.g. Wi-Fi® or Bluetooth® wireless link) or wired communication to receive the gaze data from the HMD 1250 and to transmit image data for displaying one or more images to the HMD 1250. As such, FIG. 12*b* illustrates an example in which the second user wears the HMD 1250 to view images generated by the data processing apparatus 1200 and the gaze data for the second user is communicated from the HMD 1250 to the data processing apparatus. For the system in FIG. 12*b*, the input circuitry 1220 may receive the gaze data for the first user from one or more remote servers (for example, via the internet) or an another HMD worn by the first user or a gaze detector configured to capture images of the first user. In the above discussion, the display unit 850, 950 may be configured in a similar manner to the HMD 1250 so as to display one or more images to the second user and a gaze detector associated with the display unit 850, 950 can be configured to communicate with the data processing apparatus 1200 to transmit the gaze data for the second user to the data processing apparatus 1200. Referring again to FIG. 12*a*, it will be appreciated that whilst FIG. 12*a* illustrates a data processing apparatus 1200 for generating one or more images for display to the second user, in some embodiments the data processing apparatus 1200 can generate images for display to more than one user. In other words, the processing circuitry 1230 is configured to generate one or more images for display to the second user and in some cases can also be configured to generate one or more images for display to the first user. For example, the data processing apparatus 1200 may be provided as part of a remote server in communication with a first data processing apparatus that is local to the first user and a second data processing apparatus that is local to the second user, so that images can be generated by the data processing apparatus 1200 and communicated to the respective data processing apparatuses for display to the respective users. In this case, the server is configured to receive gaze data for the first user from the first user's device and to receive gaze data for the second user from the second user's device, and the avatar monitoring circuitry 1210 may thus store first avatar information for the first user and second avatar information for the second user. In another example, the first user may wear a first HMD, the second user may wear a second HMD, and the data processing apparatus 1200, the first HMD and the second HMD may be provided locally with respect to each other (e.g. connected to the same local area network (LAN)) such that the data processing apparatus 1200 is configured to communicate with the first and second HMDs via a wireless (e.g. Wi-Fi® or Bluetooth® wireless link) or wired communication to receive the gaze data from the first and second HMDs and to transmit image data to the first and second HMDs for displaying one or more images.

In some cases the data processing apparatus 1200 may be provided as part of the second user's HMD and/or game console, in which case the data processing apparatus 1200 may generate images for display to the second user and another information processing apparatus (e.g. the first user's HMD or game console or a remote server) may be responsible for generating one or more images for display to the first user. Therefore, in some cases each user may have a data processing apparatus 1200 comprising the avatar monitoring circuitry 1210, input circuitry 1220 and processing circuitry 1230, such that a first data processing apparatus 1200 associated with the first user generates one or more images for display to the first user and a second data processing apparatus 1200 associated with the second user generates one or more images for display to the second user. The first data processing apparatus 1200 associated with the first user and the second data processing apparatus 1200 associated with the second user may both operate in a similar manner. The first data processing apparatus 1200 receives first gaze data for the first user and can be configured to communicate information indicative of the first gaze data for the first user to the second information processing apparatus 1200 associated with the second user. Similarly, the second data processing apparatus 1200 receives second gaze data for the second user and can be configured to communicate information indicative of the second gaze data for the second user to the first data processing apparatus 1200 associated with the first user. The first data processing apparatus 1200 and the second data processing apparatus 1200 can be configured to communicate directly with each other via a peer-to-peer communication or to communicate via one or more remote servers. Therefore, the first data processing apparatus 1200 associated with the first user is capable of receiving both the first gaze data and the second gaze data, and similarly the second data processing apparatus 1200 associated with the second user is capable of receiving both the first gaze data and the second gaze data.

Referring again to the system in FIG. 12*b*, in embodiments of the disclosure the system comprises another data processing apparatus 1200 (not shown in FIG. 12*b*) which is associated with the first user and configured to generate one or more images for display to the first user. As such, the system in FIG. 12*b* may comprise a first data processing apparatus 1200 associated with the first user and a second data processing apparatus associated with the second user, where the two apparatuses operate in a similar manner. The second data processing apparatus 1200 associated with the second user has been discussed previously with respect to FIG. 12*b*, The first data processing apparatus 1200 associated with the first user can be configured to: generate one or more images for the virtual reality environment for display to the first user; receive a gaze data request from the second data processing apparatus 1200 for the gaze data for the first user in response to the selection of the first avatar by the second data processing apparatus 1200; and transmit information indicative of the gaze data for the first user to the second data processing apparatus 1200 in response to receiving the gaze data request. Hence more generally, the second data processing apparatus 1200 can be configured to transmit a gaze data request directly to the first data processing apparatus 1200 so that the second data processing apparatus 1200 can receive information from the first data processing apparatus 1200 indicative of the first user's gaze data, and the second data processing apparatus 1200 can select one or more objects in dependence upon the first user's gaze data and store corresponding first avatar information.

Referring again to FIG. 12*a*, in some examples the processing circuitry 1230 can be configured to generate one or more first images for display to the first user and one or more second images for display to the second user. The first images can be generated for display to the first user, where a viewpoint associated with the first images is adjusted according to a user input from the first user so that the viewpoint corresponds to a position and/or orientation associated with the first user's avatar in the virtual reality environment (e.g. a first person viewpoint or third person viewpoint for the first avatar associated with the first user).

The second images can be generated for display to the second user, where a viewpoint associated with the second images is fixed with respect to the virtual reality environment or adjusted according a user input from the second user to adjust a position and/or orientation of the viewpoint with respect to the virtual reality environment. In some examples, the second user may have a corresponding avatar (referred to herein as the second avatar) in the virtual reality environment, such that second images are generated by the processing circuitry 1230 for display to the second user, where a viewpoint associated with the second images is adjusted according to a position and/or orientation associated with the second avatar within the virtual reality environment (e.g. a first person viewpoint or third person viewpoint for the second avatar).

In some embodiments, the virtual reality environment comprises a plurality of avatars, as discussed in more detail later, and the one or more images generated for display to the second user by the processing circuitry 1230 may have a viewpoint corresponding to a first person viewpoint (or a third person viewpoint) for one of the avatars. In the following discussion, the first avatar in the virtual reality environment is targeted by the second user's gaze point and one or more images are generated for display to the second user to include one or more graphical elements indicative of the first avatar information. In this case, the viewpoint for the one or more images for display to the second user may correspond to a first person viewpoint (or a third person viewpoint) for an avatar associated with a third user in the virtual reality environment (the third user being a user that is different from the first and second users referred to above). As such, the position and/or orientation of the avatar changes according to a control input of the third user, and the second images are generated for display to the second user such that the second user is a spectator that views images from the first or third person viewpoint for the avatar of the third user. References herein to the second user being a spectator refer to the case in which the second user does not have an avatar and does not actively participate in the virtual reality environment, and the second user views the virtual reality environment from a viewpoint that may be fixed within the virtual environment or may move within the virtual environment according to a movement of another user's avatar in the virtual environment or may move within the virtual environment according to a user input from the second user to adjust a position and/or orientation of the viewpoint.

The input circuitry 1220 is configured to receive gaze data for the second user. The gaze data for the second user is output from a gaze detector arranged with respect to the second user and is indicative of a gaze point for the second user with respect to the virtual reality environment represented in one or more images displayed to the second user. The input circuitry 1220 is configured to receive the gaze data for the second user from the gaze detector via a wired or wireless communication link (e.g. Bluetooth® or Wi-Fi® wireless link). For example, the input circuitry 1220 can be configured to receive the gaze data for the second user from at least one of: an HMD configured to detect eye movements of the second user when wearing the HMD, a gaze detector configured to detect eye movements of the second user when not wearing an HMD; and a processing device (e.g. a games console or a remote server) in communication with such an HMD and/or gaze detector.

Each object in the virtual reality environment occupies a region of the virtual reality environment and references herein to a position of an object (virtual object) refer to a position within the region of the virtual environment occupied by the object. Using the gaze data for the second user, the processing circuitry 1230 is configured to select a given virtual object in dependence upon the gaze point for the second user with respect to the position of the given virtual object in the virtual reality environment. As discussed previously, the virtual reality environment comprises the first avatar corresponding to the first user, the first avatar being an object. The processing circuitry 1230 is configured to select the first avatar in dependence upon the gaze point for the second user with respect to the position of the first avatar in the virtual reality environment. The processing circuitry 1230 can be configured to select the first avatar depending on whether the gaze point for the second user corresponds to the position of the first avatar. In other words, the first avatar is selected in response to detecting that the gaze point has a position in the virtual reality environment corresponding to a region occupied by the first avatar. In some cases, the processing circuitry 1230 can be configured to detect a spatial separation between the position of the first avatar in the virtual reality environment and the gaze point and to select the first avatar in dependence upon whether the spatial separation is less than or equal to a predetermined separation distance used for object selection. This is discussed in more detail later. In response to the processing circuitry 1230 selecting the first avatar, the processing circuitry 1230 is configured to generate one or more images for the virtual reality environment for display to the second user by including one or more graphical elements in the one or more images, in which a graphical element is indicative of the avatar information stored in association with the first avatar. In other words, the processing circuitry 1230 is configured to generate the one or more images responsive to a given avatar in the virtual reality environment being selected by the processing circuitry 1230 by including at least one graphical element in one or more of the images to visually indicate to the second user one or more properties associated with avatar information stored for the given avatar that is selected by the processing circuitry 1230.

The avatar monitoring circuitry 1210 is configured to store first avatar information for the first avatar in the virtual reality environment. In response to the processing circuitry 1230 selecting the first avatar, as discussed above, the first avatar information stored by the avatar monitoring circuitry 1210 for the first avatar is accessed and at least one graphical element is generated for display in the one or more images generated for display to the second user, such that a visual indication of one or more objects previously looked at and/or currently being looked at by the first user is provided to the second user in the one or more images.

A description of processing performed by the avatar monitoring circuitry 1210 to obtain the first avatar information for the first avatar is given below. It will be appreciated that avatar information can be obtained for any avatar in the virtual reality environment that is associated with a user as long as the avatar monitoring circuitry 1210 receives gaze data for the user. Therefore, for a virtual reality environment comprising a plurality of avatars, the avatar monitoring circuitry 1230 can be configured to receive gaze data for any user having an avatar and to monitor the user's gaze data to obtain and store avatar information for that user.

The avatar monitoring circuitry 1210 is configured to receive gaze data for the first user associated with the first avatar in the virtual reality environment. The gaze data for the first user is output from a gaze detector arranged with respect to the first user and is indicative of a gaze point for the first user with respect to the virtual reality environment represented in one or more images displayed to the first user. The gaze detector and the first user may be local to the data processing apparatus 1200 (e.g. connected to the same local area network (LAN) and the data processing apparatus 1200 can be configured to receive the gaze data for the first user from the gaze detector (or a processing device connected to the gaze detector) via a wired or wireless (e.g. Bluetooth® or Wi-Fi® wireless link) communication link. In some examples, the data processing apparatus 1200 may be provided remotely with respect to the gaze detector and the first user. For example, the data processing apparatus 1200 may be provided as part of the second user's game console or personal computer (or a server), and the first user may be located elsewhere (e.g. in another building or in another country) and have their own processing device. In this case, the avatar monitoring circuitry 1210 can be configured to receive the gaze data for the first user via one or more remote processing devices (for example, via a remote server) or directly from the processing device associated with the first user via peer-to-peer communication.

As discussed previously, in some cases each user may have a data processing apparatus 1200 comprising the avatar monitoring circuitry 1210, input circuitry 1220 and processing circuitry 1230. The first data processing apparatus 1200 associated with the first user and the second data processing apparatus 1200 associated with the second user may both operate in a similar manner. The first data processing apparatus 1200 receives first gaze data for the first user and can be configured to communicate information indicative of the first gaze data for the first user to the second information processing apparatus 1200 associated with the second user. Similarly, the second data processing apparatus 1200 receives second gaze data for the second user and can be configured to communicate information indicative of the second gaze data for the second user to the first information processing apparatus 1200 associated with the first user. The first data processing apparatus 1200 and the second data processing apparatus 1200 can be configured to communicate directly with each other via a peer-to-peer communication or via one or more remote servers so that the first data processing apparatus 1200 associated with the first user is capable of receiving both the first gaze data and the second gaze data, and similarly the second data processing apparatus 1200 associated with the second user is capable of receiving both the first gaze data and the second gaze data. Consequently, gaze data for a user can be shared with a data processing apparatus 1200 associated with another user either directly or via one or more servers. In some examples, a user's data processing apparatus 1200 can be configured to periodically receive gaze data for another user either from another user's data processing apparatus 1200 or from one or more remote servers. For example, the first data processing apparatus 1200 associated with the first user may be configured to periodically transmit the gaze data for the first user to one of a server and the second information processing apparatus 1200 associated with the second user. Alternatively, a user's data processing apparatus 1200 can be configured to request gaze data for a given user in response to the processing circuitry 1230 of the user's data processing apparatus 1200 selecting a given avatar associated with the given user, as discussed later with reference to FIG. 12c.

The avatar monitoring circuitry 1210 is configured to detect the first user's gaze point with respect to the virtual reality environment and to select a given object in the virtual reality environment in dependence upon whether the gaze point for the second user corresponds to a position of the given object. In some cases, the avatar monitoring circuitry 1210 can be configured to detect a spatial separation between the position of the given object in the virtual reality environment and the gaze point for the first user, and to select the given object in dependence upon whether the spatial separation is less than or equal to a predetermined separation distance used for object selection. Therefore, as the first user views the images of the virtual reality environment and directs their gaze point towards respective objects in the virtual reality environment, the avatar monitoring circuitry 1210 can track the gaze point, select a given object in response to the given object being looked at, and record information associated with the selected object. In this way, avatar information can be stored for the first user indicative of one or more properties of an object selected by the avatar monitoring circuitry 1210. By monitoring the first user's gaze data over a period of time, avatar information can be obtained for the first user, in which the avatar information comprises information for a plurality of selected objects in the virtual reality environment. For example, the user may firstly look at object A and then subsequently look at object B, in which case the avatar monitoring circuitry 1210 can firstly select the object A and store a first entry in the avatar information comprising information indicative of one or more properties associated with object A and then subsequently select the object B and store a second entry in the avatar information comprising information indicative of one or more properties associated with object B. In this way, the first avatar information can be obtained for the first avatar indicative of one or more objects selected by the avatar monitoring circuitry 1210 on the basis of the first user's gaze data. The selected object may for example be another avatar in the virtual environment which may correspond to another user or may correspond to a non-player character (NPC), or the selected object may be another type of virtual object such as a virtual car, a virtual tree or a virtual weapon within the virtual reality environment.

Figure 12C:
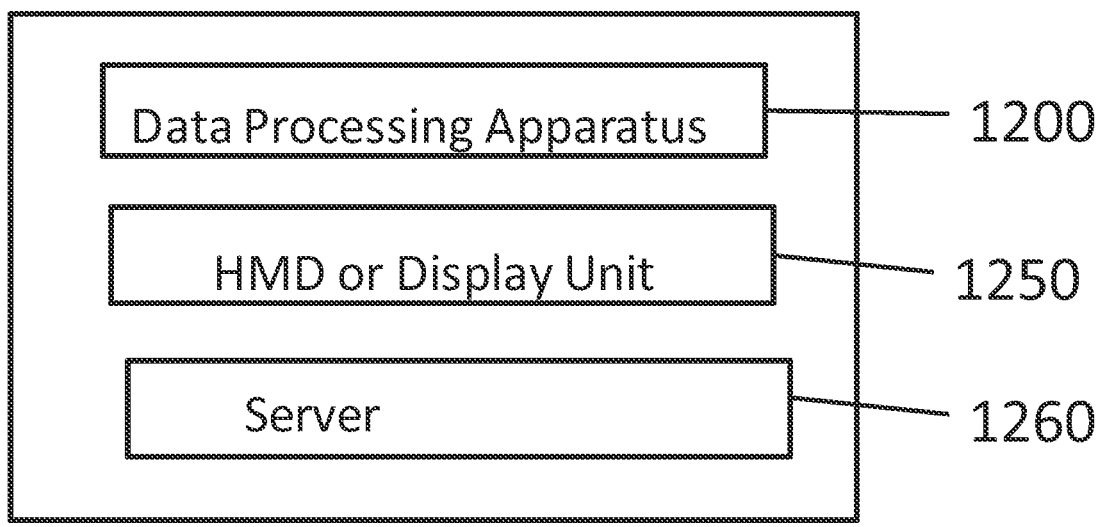
FIG. 12c schematically illustrates another system.

Referring now to FIG. 12c, in embodiments of the disclosure, a system comprises: the data processing apparatus 1200; one of a head-mountable display (HMD) and a display unit 850, 950 to output the one or more images for display to the second user; and a server 1260 to receive a gaze data request from the data processing apparatus 1200 for the gaze data for the first user in response to the selection of the first avatar, in which the server 1260 is configured to transmit information indicative of the gaze data for the first user to the data processing apparatus in response to receiving the gaze data request. In FIG. 12c, the data processing apparatus 1200 is associated with the second user and generates one or more images for display to the second user. The data processing apparatus 1200 is thus configured to receive second gaze data for the second user using the input circuitry 1220 and to select the first avatar in dependence upon the gaze point for the second user with respect to the first avatar in the virtual reality environment. The data processing apparatus 1200 can be configured to transmit a gaze data request for requesting the first gaze data for the first user in response to the selection of the first avatar by the processing circuitry 1230. Therefore, a gaze data request for the first user's gaze data can be transmitted, and the server 1260 can be configured to transmit information indicative of the gaze data for the first user to the data processing apparatus 1200 responsive to the request. In this way, the avatar monitoring circuitry 1210 of the data processing apparatus 1200 can receive at least some of the gaze data for the first user and the avatar monitoring circuitry 1210 can be configured to select one or more objects in the virtual reality environment and store first avatar information indicative of one or more of the selected objects. The gaze data transmitted by the server 1260 may comprise information indicative of one or more gaze points (e.g. coordinates within the virtual reality environment) and one or more corresponding time stamps.

In some cases, a threshold condition may be specified as part of the gaze data request so that the gaze data transmitted by the server 1260 to the data processing apparatus 1200 in response to the request comprises information indicative of one or more gaze points corresponding to a given region viewed by the first user for at least a threshold amount of time and one or more corresponding time stamps. For example, the gaze data request may specify a threshold distance and threshold time so that the gaze data transmitted in response to the request comprises information for gaze points corresponding to one or more regions that are targeted by the user for at least the threshold time. Hence more generally, the gaze data transmitted in response to the request may indicate regions having a size (e.g. radius or diameter) less than or equal to the threshold distance that are looked at by the user for at least the threshold amount of time. In this way, the gaze data transmitted to the data processing apparatus 1200 can be filtered so that only gaze points associated with regions of interest may be transmitted. Therefore, the avatar monitoring circuitry 1210 can receive at least some of the first user's gaze data and select one or more objects in the virtual reality environment in dependence upon the first user's gaze data and store corresponding first avatar information. As discussed later, the first avatar information may comprise first time information and/or second time information associated with a selected object, and when the avatar monitoring circuitry 1210 receives gaze data for a user in response to a gaze data request, one or more time stamps associated with the received gaze data may be used for generating the first time information so as to indicate the time at which the first user targeted an object with their gaze point and one or more of the time stamps may similarly be used for generating the second time information so as to indicate an amount of time spent by the first user looking at an object.

Still referring to the system in FIG. 12c, the server 1260 can be configured to periodically receive gaze data for one or more users having an associated avatar in the virtual reality environment and to store information indicative of the gaze data for a given user. The server 1260 can receive the gaze data for a given user and store information indicative of one or more gaze points and one or more corresponding time stamps. In some cases, the server 1260 can be configured to store the gaze data for a given user in dependence upon one or more threshold conditions so as to store a portion of the gaze data indicative of one or more gaze points corresponding to one or more regions viewed by the first user for at least a threshold amount of time. As such, the gaze data may be stored for gaze points associated with regions viewed by the first user for at least a threshold amount of time corresponding to regions of interest for the first user. As such, the server 1260 can be configured to receive one or more gaze data requests from one or more data processing apparatuses 1200 associated with one or more users, and in response gaze data for the user indicated as part of the request can be transmitted. In some examples, the server 1260 may further comprise processing circuitry 1230 for generating image data to be transmitted to the user devices for displaying images for the virtual reality environment. The server 1260 may for example be a gaming server. The functionality of the processing circuitry 1230 may be performed in a distributed manner using a combination of processing devices (for example, a combination of processing performed by a user's data processing apparatus 1200 and the server 1260).

Whilst FIG. 12c illustrates a system in which the server 1260 functions as a gaze request receiving server for transmitting gaze data for a user in response to receive a gaze data request and the data processing apparatus 1200 is provided locally with respect to the second user, in some examples the server 1260 may instead comprise the avatar monitoring circuitry 1210 and function as an avatar information request receiving server. As discussed previously, in some cases the avatar monitoring circuitry 1210 can be provided as part of a server (such as the server 1260) and the input circuitry 1220 and the processing circuitry 1230 can be provided as part of a user's device. In some cases, each of the avatar monitoring circuitry 1210, input circuitry 1220 and processing circuitry 1230 may be provided as part of the server 1260. Therefore, the server 1260 may periodically receive gaze data for one or more users having an associated avatar in the virtual reality environment and store avatar information for each user. The server 1260 can thus be configured to receive a request from a user's device 1200 (e.g. the second user's device) for avatar information for a given user having an associated avatar in the virtual reality environment. In particular, the processing circuitry 1230 provided as part of the second user's device 1200 can be configured to select a given avatar in dependence upon the gaze point for the second user with respect to the given avatar, and the second user's device 1200 can be configured to transmit an avatar information request to the server 1260 in response to the selection of the given avatar. The server 1260 can be configured to transmit information indicative of the avatar information for the given avatar to the data processing apparatus in response to receiving the avatar information request.

In embodiments of the disclosure, the avatar monitoring circuitry 1210 is configured to receive gaze data for each user associated with an avatar in the virtual reality environment and to store corresponding avatar information for the avatar, the virtual reality environment comprising a plurality of avatars. As discussed previously, the virtual reality environment may comprise a plurality of avatars, and a given avatar of the plurality of avatars may have a corresponding user. In some examples, each avatar in the virtual reality has a corresponding user such that there is a one-to-one correspondence between the number of avatars and the number of users. In other examples, one or more of the avatars in the virtual reality environment may be a non-player character (NPC), and as such only some of the avatars in the virtual reality environment have a corresponding user. The avatar monitoring circuitry 1210 can be configured to receive gaze data for each user having an avatar in the virtual reality environment and to store avatar information for each user's avatar. Therefore, the processing circuitry 1230 can be configured to generate the one or more images for display to the second user and, in response to any one of the user controlled avatars being selected using the second user's gaze data, the one or more images can be generated to include at least graphical element indicative of the avatar information for the selected avatar. In this way, the second user can view the virtual reality environment and when a given avatar is targeted by the gaze point, the given avatar is selected and a graphical element indicative of at least one object previously looked at and/or an object currently being looked by the user of the given avatar is generated for display to the second user. In response to the second user moving their gaze point to select another avatar, the another avatar can instead be selected by the processing circuitry 1230 so that a graphical element indicative of at least one object previously looked at and/or an object currently being looked at by the user of the another avatar is generated for display to the second user.

The processing circuitry 1230 can be configured to generate the one or more images including the at least one graphical element for display to the second user in response to the selection of the first avatar by the processing circuitry 1230. In some examples, the processing circuitry 1230 generates the one or more images including the graphical element for a predetermined period of time starting from the time at which the first avatar is selected. As such, the one or more images can be generated for display to the second user for a minimum period of time (e.g. 10 seconds) following the selection of the first avatar. Alternatively, in some cases the processing circuitry 1230 may be configured to generate the one or more images including the graphical element until another avatar is selected by the processing circuitry 1230 using the second user's gaze data. In this case, the one or more images including the graphical element indicative of the first avatar information can be displayed to the second user until the second user selects a different avatar. In this way, the second user can select the first avatar and then redirect their gaze point away from the first avatar so as to view one or more graphical elements indicative of the first avatar information that may be arranged at positions away from the first avatar within the virtual reality environment. It will be appreciated that in response to the processing circuitry 1230 subsequently selecting a different avatar, the one or more images are generated accordingly so as to include a graphical element indicative of the avatar information stored for the different avatar without including a graphical element for the first avatar. In some examples, the processing circuitry 1230 may only select virtual avatars in the virtual environment using the second user's gaze data.

In embodiments of the disclosure, the one or more objects selected by the avatar monitoring circuitry 1210 comprises one or more avatars in the virtual reality environment. The avatar monitoring circuitry 1210 monitors the gaze data for the first user and selects one or more objects identified as being looked at by the first user. The one or more objects selected by the avatar monitoring circuitry 1210 in response to the first user's gaze data may comprise one or more avatars, an avatar being a type of object in the virtual reality environment. In response to the avatar monitoring circuitry 1210 selecting an object that is an avatar, the avatar monitoring circuitry 1210 is configured to store an entry in the first avatar information comprising information indicative of one or more properties associated with the avatar selected by the avatar monitoring circuitry 1210. Consequently, the first avatar information stored for the first user comprises information indicative of objects looked at by the first user including one or more avatars that have been looked at by the first user. Therefore, one or more graphical elements can be generated for display to the second user so that the second user can be informed of the avatars in the virtual reality environment have been looked at (and/or are currently being looked at) by the first user associated with the first avatar, which may provide an indication of one or more social groups within a virtual reality environment. In particular, a number of graphical elements which may indicate a number of other avatars that the given avatar has looked at (and potentially verbally communicated with) can be generated for display to thus provide an indication of a social group for the given avatar.

The one or more images generated by the processing circuitry 1230 for display to the second user can indicate to the second user a gaze history for any given avatar in the virtual reality environment having an associated user whose gaze is monitored by the avatar monitoring circuitry 1230. By generating one or more graphical elements for display to the second user, one or more objects that are of interest (or have previously been of interest) to the first user can be indicated to the second user. This may be beneficial in that objects that are of particular interest and importance in the virtual reality environment can be indicated to the second user. Moreover, for the case in which the second user is a spectator, generating one or more graphical elements for display to the second user may provide the spectating user with additional information thereby enhancing an experience of a spectator. In particular, the graphical elements can be generated for display to the spectator to provide the spectator with a greater insight into a player's technique when interacting with the virtual reality environment, and as such in some cases the graphical element(s) may be beneficial for assisting the second user in improving their gaming skills.

In embodiments of the disclosure, the first avatar information comprises one or more from the list consisting of: identification information for the first avatar; identification information for a selected object; object type information indicative of a type of the selected object; and position information indicative of a position in the virtual reality environment for the selected object. Whilst the first avatar information stored for the first user's avatar provides an indication of one or more objects selected by the avatar monitoring circuitry 1210 in response to monitoring the first user's gaze direction, in some embodiments the first avatar information additionally comprises identification information for the first avatar. The identification information for the first avatar may comprise a name and/or and ID number associated with the first avatar for use in distinguishing the first avatar from other objects in the virtual reality environment. A graphical element can be generated for displaying the identification information for the first avatar in response to the processing circuitry 1230 selecting the first avatar. For example, the graphical element may take the form of a window positioned adjacent to the first avatar in the images of the virtual reality environment comprising one or more textual elements for indicating a name for the avatar and/or a name of the user's profile.

Alternatively or in addition, the first avatar information may comprise identification information for a selected object in the first avatar information, in which the identification information comprises a name and/or an ID number associated with the selected object for use in distinguishing the selected object from the other objects in the virtual reality environment. For example, the selected object may be another avatar and the identification information may comprise a name for the avatar and/or a name of the user's profile if that avatar has a corresponding user. The selected object may for example be a virtual car and the identification information may comprise a name for the car and/or a model of the car. Similarly, the selected object may for example be a virtual weapon and the identification information may comprise a name for the weapon and/or a model of the weapon.

Alternatively or in addition, the first avatar information may comprise object type information indicative of a type of the selected object. The object type information is indicative of a category associated with the selected object and may take a variety of different forms depending on the virtual reality environment. For example, the object type information may indicate that the selected object is an avatar. The object type information (object classification information) may indicate that the selected object is a wall, tree, vehicle or weapon, for example. In some examples, the object type information may be used to classify objects as fixed (static within the virtual reality environment) or mobile (position can vary with respect to time).

Alternatively or in addition, the first avatar information may comprise position information indicative of a position in the virtual reality environment for the selected object. The position information provides an indication of the position of the object in the virtual reality environment and may for example take the form of coordinates defining a position in the virtual reality environment. In some cases, a virtual reality environment may comprise a number of regions (e.g. a spawn area) and the position information may indicate an region from a plurality of regions for the virtual reality environment. As discussed previously, some objects may have a fixed position in the virtual reality environment, while other objects may move such that their position varies with respect to time. The position information for a selected object is indicative of at least one of: a position of the selected object recorded at a time when the object is viewed; and a current position of the selected object. In other words, the position information may indicate a position of an object at a time when the object is selected by the avatar monitoring circuitry 1210 and/or may indicate a most recent position of the object which may vary with respect to time for an object that is capable of moving.

In embodiments of the disclosure, the second user is associated with a second avatar in the virtual reality environment. As discussed previously, the second user can have a corresponding avatar within the virtual reality environment such that the processing circuitry 1230 generates one or more images for display to the second user in dependence upon the position and/or orientation of the second user's avatar in the virtual reality environment. In addition to receiving the gaze data for the second user, the input circuitry 1220 can be configured to receive a user input for the second user and the processing circuitry 1230 can be configured to adjust a viewpoint for the one or more images generated for display to the second user in dependence upon the user input. The user input may be indicative of a position and/or orientation of an HMD worn by the second user (such as the HMD 1250 described previously with reference to FIG. 12*b*) or may be indicative of a direction associated with one or more control sticks and/or a d-pad of a handheld controller. Therefore, the second user may actively participate in the virtual reality environment via their avatar and, using the gaze data for the second user, an avatar that is targeted by the second user's gaze direction can be selected by the processing circuitry 1230 so that avatar information for the targeted avatar is displayed to the second user in the form of one or more graphical elements.

In embodiments of the disclosure, the processing circuitry 1230 is configured to generate the one or more images for display to the second user using a virtual camera. The virtual camera has a field-of-view such that each image generated using the virtual camera includes a portion of the virtual reality environment. The position and orientation of the virtual camera with respect to the virtual reality environment may be fixed so that the images generated using the virtual camera include a given portion of the virtual reality environment. In some cases, the data processing apparatus 1200 is configured to generate images for display to the second user using one virtual camera from a plurality of virtual cameras each having a fixed configuration with respect to the virtual reality environment, where the one virtual camera is selected by the second user. For example, the second user may select a given virtual camera that is used to generate images for a given portion of the virtual reality environment. As discussed previously, the second user may have a corresponding avatar. In this case, the position and/or orientation of the virtual camera with respect to the virtual reality environment can be updated according to a position and/or orientation of the avatar so that the virtual camera tracks the avatar through the virtual reality environment. The virtual camera can be used to generate images having a first person viewpoint or a third person viewpoint for the avatar. In some cases, even when the second user does not have an avatar, a virtual camera can be used for generating the images for display to the second user, where the position and/or orientation of the virtual camera is updated according to a user input to allow the second user to spectate whilst being able to manoeuvre the virtual camera.

In embodiments of the disclosure, the avatar monitoring circuitry 1210 is configured to select a given object in the virtual reality environment in dependence upon whether the gaze point for the first user is within a predetermined distance of the given object for a predetermined period of time. The virtual reality environment comprises a plurality of virtual objects arranged within the virtual reality environment, in which each virtual object has an associated position within the virtual reality environment. The gaze data for the first user with respect to the virtual reality environment provides an indication of where in the virtual reality environment the user directs their gaze. The avatar monitoring circuitry 1210 can be configured to detect the gaze point for the first user with respect to the virtual reality environment and to detect whether the gaze point is within a predetermined distance of a given object. In response to detecting that the gaze point is within the predetermined distance of the given object for the predetermined period of time, the given object is selected by the avatar monitoring circuitry 1210 and the avatar information for the first user is updated to include an entry for the given object, where the entry includes information indicative of one or more properties for the object such as a name, type, position and/or time of selection for the object. Therefore, rather than selecting each object that is directly targeted by the user's gaze point, a requirement that an area within a predetermined distance of the object is targeted by the user's gaze point for a predetermined period of time (e.g. 3 seconds) may be used by the avatar monitoring circuitry 1210 as a condition for object selection. As such, the avatar information stored for the first user may comprise objects that have each been looked at by the first user for at least the predetermined period of time. By selecting objects in this way, the avatar information is generated and stored by the avatar monitoring circuitry 1210 in a manner so as to include objects having a predetermined level of user interest. The likelihood of erroneously selecting on object can be reduced and the likelihood of appropriately selecting one or more objects that are of interest for the first user is improved.

In embodiments of the disclosure, the processing circuitry 1230 is configured to select the first avatar in dependence upon whether the gaze point for the second user is within a predetermined distance of the first avatar for a predetermined period of time. The first avatar has an associated position within the virtual reality environment. The processing circuitry 1230 can be configured to detect the gaze point for the second user with respect to the virtual reality environment and to detect a spatial separation between the position of the first avatar in the virtual reality environment and the gaze point for the second user. The processing circuitry 1230 can thus select the first avatar in response to detecting that the gaze point is within the predetermined distance of the first avatar for the predetermined period of time. Therefore, rather than the processing circuitry 1230 selecting the first avatar according to whether the first avatar is directly targeted by the second user's gaze point in a manner such that the gaze point corresponds to the position of the first avatar, a requirement that an area within a predetermined distance of the first avatar is targeted by the user's gaze point for a predetermined period of time (e.g. 3 seconds) may be used by the processing circuitry 1230 as a condition for selection of an avatar. Therefore, the second user may be required to direct their gaze towards a portion of the virtual reality environment within the predetermined distance of the first avatar for at least the predetermined period of time in order for the first avatar to be selected, and the likelihood of the processing circuitry 1230 erroneously selecting the first avatar can be reduced. In response to the processing circuitry 1230 selecting the first avatar, the processing circuitry 1230 is configured to generate one or more images for the virtual reality environment for display to the second user by including one or more graphical elements in the one or more images, in which a graphical element is indicative of the avatar information stored in association with the first avatar.

It will be appreciated that a value of the predetermined distance used by the avatar monitoring circuitry 1210 to select one or more objects may be the same as or different from a value of the predetermined distance used by the processing circuitry 1230 to select the first avatar. Similarly, a value of the predetermined period of time used by the avatar monitoring circuitry 1210 to select one or more objects may be the same as or different from a value of the predetermined period of time used by the processing circuitry 1230 to select the first avatar. A first predetermined distance may be used by the avatar monitoring circuitry 1210 and a second predetermined distance may be used by the processing circuitry 1230, the first predetermined distance being different from the second predetermined distance. For example, the first predetermined distance may have a value of X cm, whereas the second predetermined distance may have a value of Y cm (where X is less than Y) so that a more strict condition is used by the avatar monitoring circuitry 1210. Given that a selection of an object by the avatar monitoring circuitry 1210 can cause a data entry to be generated or updated for the selected object in the first avatar information, use of a strict condition for object selection may be beneficial for efficient use of processing resources. In some examples, a value for the first predetermined distance can be selected by the avatar monitoring circuitry 1210 in dependence upon a size of an object. For example, a first value may be used for the first predetermined distance for an object having a first size and a second value may be used for the first predetermined distance for an object having a second size, where the first value is smaller than the second value and the first size is larger than the second size. In this way, a larger value for the first predetermined distance (and thus a wider tolerance) may be used for objects having a smaller size so that smaller objects can still be selected even if there are inaccuracies arising in the detection of the first user's gaze direction. Conversely, a smaller value for the first predetermined distance may be used for objects having a larger size, because larger objects can be more easily targeted by the user's gaze point even in the case where inaccuracies may arise in the detection of the first user's gaze direction.

In some examples, a first predetermined period of time is used by the avatar monitoring circuitry 1210 and a second predetermined period of time is used by the processing circuitry 1230, the first predetermined period of time being different from the second predetermined period of time. Selection of an object by the avatar monitoring circuitry 1210 can cause a data entry to be generated for the selected object in the first avatar information. Consequently, a value for the first predetermined period of time may be selected so that when using a smaller value (e.g. X seconds) the first avatar information comprises information regarding a larger number of objects viewed by the first user, and when using a larger value (e.g. Y seconds, where Y is greater than X) the first avatar information comprises information regarding a smaller number of objects viewed by the first user. As such, by using a larger value for the first predetermined period of time, the first avatar information can be limited to information for objects viewed for the longest and thus of highest interest to the first user.

In embodiments of the disclosure, the first avatar information comprises at least one of: first time information indicative of a time associated with the selection by the avatar monitoring circuitry of the selected object; and second time information indicative of a period of time for which the gaze point for the first user is within a predetermined distance of the selected object. The avatar monitoring circuitry 1210 is configured to select one or more objects in the virtual reality environment in dependence upon the gaze data for the first user, and at least one of the first time information and the second time information can be recorded for a selected object. The avatar monitoring circuitry 1210 can be configured to store the first time information indicative of a time at which the avatar monitoring circuitry 1210 selects an object. For example, in response to detecting that the gaze point corresponds to a position of an object at a time T1, or detecting at a time T1 that the gaze point is within a predetermined distance of a position of an object for a predetermined period of time, the avatar monitoring circuitry 1210 can be configured to select the object and to store an entry (data field) in the first avatar information for the selected object comprising the first time information indicative of the time T1. In this way, the first avatar information can be stored for the first user to provide an indication of an object selected by the first user's gaze point and a time at which the object is selected. Therefore, the first time information is indicative of a time at which the user initially looked at the selected object. For example, the first time information may be indicative of a date and a time (e.g. 24 hour clock) or may be indicative of a time relative to a reference time (e.g. 3 minutes and 25 seconds from a time at which the first avatar entered the virtual reality environment or from a start time for a game). As discussed previously, in addition to at least one of the first time information and the second time information, the entry for the selected object may also comprise identification information for a selected object and/or object type information indicative of a type of the selected object and/or and position information indicative of a position in the virtual reality environment for the selected object.

The avatar monitoring circuitry 1210 can be configured to store the second time information indicative of a period of time for which the gaze point for the first user is within a predetermined distance of the selected object. For example, in response to detecting that the gaze point corresponds to a position of an object at a time T1, the avatar monitoring circuitry 1210 can select the object at the time T1. In response to selecting the object, the avatar monitoring circuitry 1210 can detect whether the gaze point is within the predetermined distance of the selected object and record an amount of time from the time T1 until the gaze point is not within the predetermined distance at a time T2. In response to detecting that the gaze point is not within the predetermined distance of the selected object at the time T2, the avatar monitoring circuitry 1210 stores the first avatar information by generating an entry for the select object comprising the second time information indicative of an amount of time between the time T1 and the time T2. Therefore, the second time information is indicative of an amount of time spent by the first user looking at the selected object. In some cases, the avatar monitoring circuitry 1210 is configured to select the object in dependence upon whether the gaze point for the first user is within a predetermined distance of the given object for a predetermined period of time. In this case, the avatar monitoring circuitry 1210 is configured to detect whether the gaze point is within a predetermined distance of a given object for the predetermined period of time. In response to detecting at a time TD2 (note the labels TD1, TD2 and TD3 are used here to distinguish from the labels T1 and T2 used above) that the gaze point of the first user is within the predetermined distance of a given object for the predetermined period of time, the avatar monitoring circuitry 1210 is configured to select the given object and to record an amount of time from a time TD1 representing a time at which the gaze point of the first user is first detected as being within the predetermined distance until a time TD3 at which the gaze point is not within the predetermined distance. As such, the time TD2 represents the time at which the condition for object selection is met such that the avatar monitoring circuitry 1230 selects the given object, and the time TD1 is earlier in time than the time TD2. The avatar monitoring circuitry 1210 is configured to store the first avatar information by generating an entry for the selected object comprising the second time information indicative of an amount of time between the time TD1 and the time TD3. Therefore, the second time information is indicative of an amount of time spent by the first user looking at the selected object. It will be appreciated that the amount of time between the time TD1 and the time TD3 may be calculated by the avatar monitoring circuitry 1210 on the basis of the time TD2 (time at which object is selected), the time TD3 (time at which the gaze point is detected as not being within the predetermined distance) and a value used for the predetermined period of time, such that the amount of time between TD1 and TD3 can be calculated by adding the value for the predetermined period of time between TD2 and TD3.

In some examples, the second time information stored for an object is indicative of a total amount of time spent by the first user looking at that object, where the total amount of time may be recorded according to one or more respective instances where the first user looks at the object. For example, the first user may direct their gaze towards a given object at a first point in time, then view one or more other objects and then subsequently direct their gaze towards the given object again such that the given object is selected more than once by the avatar monitoring circuitry 1210. In this case, the avatar selection circuitry 1210 may select the given object and generate an entry in the first avatar information for the selected object comprising at least one of the first time information and the second time information, and in response to the given object being subsequently selected by the avatar monitoring circuitry 1210 at least one of the first time information and the second time information can be updated. The first time information may for example be updated so that the first time information is indicative of a most recent time at which the object was selected by the avatar monitoring circuitry 1210. There are a number of possible ways in which the second time information may be updated. The avatar monitoring circuitry 1210 may update the second time information for an object in response to that object being selected so that the second time information is indicative of a cumulative amount of time spent by the first user looking at the object. In particular, each time a given object is selected by the avatar monitoring circuitry 1210, a period of time spent by the user looking at that given object can be detected and used to update the second time information so that the second time information is indicative of the total amount of time spent by the first user looking at that object. In some cases, the avatar monitoring circuitry 1210 may update the second time information for an object only in response to detecting that the period of time spent by the user looking at the object is greater than a period of time already indicated by the second time information, so that the second time information is indicative of a longest period of time spent by the first user looking at the selected object. In this way, the second time information for a given object can provide an indication of a longest period of time spent by the first user looking at the given object without interruption.

In embodiments of the disclosure, the avatar monitoring circuitry 1210 is configured to assign a priority rating to at least some of the selected objects in the first avatar information in dependence upon either the first time information or the second time information associated with the selected objects in the first avatar information. The priority rating is assigned to at least some of the selected objects in the first avatar information so as to define an order of priority for the respective selected objects. The first time information is indicative of a time at which an object is selected by the avatar monitoring circuitry 1210. The avatar monitoring circuitry 1210 can be configured to assign a priority rating to some of the selected objects (or each selected object) in the first avatar information in dependence upon the first time information, so that a highest priority rating is associated with an object having a most recent time of selection (an object viewed most recently by the first user) and a lowest priority rating is associated with an object having a least recent time of selection. In this way, selected objects in the first avatar information can be ranked according to how recently they have been viewed by the first user. The second time information is indicative of an amount of time spent by the first user looking at the selected object. The avatar monitoring circuitry 1210 can be configured to assign a priority rating to some of the selected object (or each selected object) in the first avatar information in dependence upon the second time information, so that a highest priority rating is associated with an object viewed by the first user for a longest period of time and a lowest priority rating is associated with an object viewed by the first user for a shortest period of time. In this way, selected objects in the first avatar information can be ranked according to how long they have been viewed for by the first user.

The avatar monitoring circuitry 1210 can be configured to assign a priority rating to each selected object in the first avatar information in dependence upon either the first time information or the second time information associated with each selected object in the first avatar information. However, in some cases the avatar monitoring circuitry 1210 can be configured to assign a priority rating to some (a subset) of the selected objects in the first avatar information. For example, in some cases one or more selected objects in the first avatar information having first time information indicating that a predetermined amount of time (e.g. 5 minutes or 1 hour) has elapsed since they were selected may not be assigned a priority rating by the avatar monitoring circuitry 1210. Similarly, in some cases one or more selected objects in the first avatar information having second time information indicating that they were viewed by the first user for less than a predetermined period of time may not be considered by the avatar monitoring circuitry 1210 when assigning the priority rating. Alternatively or in addition, certain objects having a large size (such as a floor or a wall in the virtual reality environment) may be frequently selected by the avatar monitoring circuitry 1210 according to the first user's gaze data and/or detected as being looked at for a long period of time due to their relatively large size within the virtual reality environment. As such, in some examples, the avatar monitoring circuitry 1210 can be configured to assign a priority rating to at least some of the selected objects so that a priority rating is not assigned to objects having a large size. For example, the avatar monitoring circuitry 1210 can be configured to assign a priority rating to a selected object depending on whether a size of the selected object is less than a predetermined size. Therefore, for large objects that represent a significant portion of the virtual reality environment viewed by the first user (and which, by virtue of their size, are likely to be frequently targeted by the user's gaze even though they are not an object of particular interest) may not be assigned a priority rating. Alternatively or in addition, for cases in which the first avatar information comprises object type information for each of the selected objects, the avatar monitoring circuitry 1210 can be configured to assign a priority rating to a selected object depending on whether the selected object is a predetermined type of object. For example, the object type information may indicate that a given object is a wall or a floor, for example. As such, one or more selected objects in the first avatar information corresponding to a first predetermined type (e.g. wall or floor) of object may not be assigned a priority rating by the avatar monitoring circuitry 1210, and one or more selected objects in the first avatar information corresponding to a second predetermined type (e.g. avatar) of object may be assigned a priority rating by the avatar monitoring circuitry 1210.

In some examples, the first avatar information may comprise a plurality of selected objects and some of the plurality of selected objects may be selected avatars. The avatar monitoring circuitry 1210 can be configured to assign a priority rating to a selected object depending on whether the selected object is an avatar. Whether or not an object is an avatar may be identified on the basis of the object type information and/or the identification information for a selected object in the first avatar information. Therefore, in some cases the avatar monitoring circuitry 1210 can be configured to assign a priority rating to just the selected avatars in the first avatar information so as to define an order of priority for the respective selected avatars.

In some cases the avatar monitoring circuitry 1210 can be configured to remove one or more selected objects from the first avatar information. In this way, if the number of selected objects in the first avatar information exceeds a predetermined number of selected objects, the avatar monitoring circuitry 1210 can be configured to remove a selected object so as to control a data size of the first avatar information. As such, eviction of selected object from the first avatar information may be performed using one of the first time information and the second time information.

In embodiments of the disclosure, the processing circuitry 1230 is configured to generate the one or more images to include a predetermined number of graphical elements, in which the processing circuitry 1230 is configured to assign one of the graphical elements to one of the selected objects having an assigned priority rating in the first avatar information in dependence upon the priority ratings. As discussed above, a priority rating can be assigned to at least some of the selected objects in the first avatar information in dependence upon either the first time information or the second time information so as to order at least some of the selected objects according to how recently they were selected by the avatar monitoring circuitry 1210 or how long they were looked at by the first user. The processing circuitry 1230 can be configured to generate a predetermined number of graphical elements for inclusion in the one or more images generated by the processing circuitry 1230 for providing a visual indication of the first avatar information. The processing circuitry 1230 can assign one of the graphical elements to one of the selected objects in the first avatar information having an assigned priority rating. The respective priority ratings for the respective objects can be compared with each other to define an order of priority for the selected objects in the first avatar information. Therefore, a first graphical element can be assigned to a selected object with the highest priority rating and a second graphical element can be assigned to a selected object with the second highest priority rating. Therefore, in the case where N graphical elements are generated (for example, N may be equal to 5), the N graphical elements can be assigned to the N selected objects having the highest priority ratings. Therefore, the graphical elements can be generated for display to the second user to visually indicate N objects in the virtual reality environment that have been most recently looked at by the first user (first time information), or that have been targeted by the first user's gaze point for the longest period of time (second time information). In this way, in response to the second user's gaze point being used by the processing circuitry 1230 to select the first avatar, the one or more images can be generated for display to the second user to inform the second user of the N virtual objects that are of most interest to the first user associated with the first avatar.

In embodiments of the disclosure, the processing circuitry 1230 is configured to generate the one or more images to include at least one graphical element for each of the selected objects having an assigned priority rating in the first avatar information, in which the processing circuitry 1230 is configured to adjust at least one of a size, shape, colour and luminosity of a graphical element in dependence upon the priority rating. A priority rating can be assigned to at least some of the selected objects in the first avatar information in dependence upon either the first time information or the second time information. The processing circuitry 1230 can generate the one or more images for display to the second user to include one or more graphical elements for each selected object that has been assigned a priority rating by the avatar monitoring circuitry 1210. Therefore, in some examples the processing circuitry 1230 may generate two or more graphical elements for each selected object having a priority rating, in which at least one of the graphical elements is generated in dependence upon the priority rating so as to provide an indication of a level of priority associated with the selected object. Hence more generally, a graphical element can be generated for a given selected object having an associated priority rating according to the priority rating for that selected object, so that the graphical element is indicative of the priority rating for that given selected object.

The graphical elements can be generated such that a first graphical element having a first size is generated for a first selected object having a higher priority and a second graphical element having a second size is generated for a second selected object having a lower priority, in which the first size is larger than the second size (where higher priority may for example correspond to a selected object more recently selected when assigning priority ratings in dependence upon the first time information). Consequently, a graphical element having a larger size can be associated with an object having a higher priority and a graphical element having a smaller size can be associated with an object having a lower priority. The one or more images can be generated to include the graphical elements so as to visually indicate to the second user a relative priority for the objects in the first avatar information on the basis of the relative sizes of the graphical elements. In some examples, the first graphical element and the second graphical element associated with the first and second selected objects, respectively, may have the same 2D or 3D shape (e.g. they may both be circular, triangular or spherical) or some of the graphical objects may have different shapes. For example, the processing circuitry 1230 can generate a graphical element for each selected object in the first avatar information, in which each graphical element has a circular shape and is included in the one or more images so as to be positioned within a predetermined distance of the selected object (e.g. above, below or next to the selected object) and each circular shape has a size (area in the one or more images) that is dependent upon the priority rating for that selected object so that a larger circular shape is indicative of a higher priority object.

Alternatively or in addition, the graphical elements may be generated such that a first graphical element having a first shape is generated for a first selected object having a higher priority and a second graphical element having a second shape is generated for a second selected object having a lower priority. Consequently, a graphical element having a first shape may be associated with an object having a highest priority and a graphical element having a second shape may be associated with an object having a lower priority. For example, a graphical element having a first shape, such as a star, may be included in the one or more images so as to be positioned within a predetermined distance of an object having the highest priority, whereas one or more graphical elements having a second shape, such as a circle, square or cube, may be associated with one or more other selected objects of lower priority and positioned within a predetermined distance of their corresponding objects in the one or more images. In this way, the star shape may be used to distinguish the highest priority object from the other objects. In some examples, a plurality of (e.g. 5) of graphical elements having the first shape may be generated such that the plurality of graphical elements indicate the "top 5" (or more generally "top N") objects in the first avatar information whilst using the second shape to indicate other objects of interest that are not in the top 5 highest priority objects. In some examples, a sequence of shapes may be used where a first shape corresponds to highest priority, a second shape corresponds to next highest priority, a third shape corresponds to next highest priority and so on.

Alternatively or in addition, the graphical elements may be generated such that a first graphical element having a first colour is generated for a first selected object having a higher priority and a second graphical element having a second colour is generated for a second selected object having a lower priority. A graphical element having a first colour may therefore be associated with an object having a highest priority and a graphical element having a second colour may be associated with an object having a lower priority. A graphical element having the first colour may be generated for indicating the highest priority object or a plurality of graphical elements having the first colour may be generated and included in the images so as to indicate the "top N" highest priority objects in the first avatar information on the basis of colour. In a manner similar to that discussed above, a sequence of colours may be used to indicate relative priority. For example, a colour sequence of red, orange, yellow, green and blue may be used where red corresponds to highest priority and blue corresponds to lowest priority. It will be appreciated that any sequence of colours may be used for indicating the relative priority of the selected objects in the first avatar information when generating the one or more images including the graphical elements.

Alternatively or in addition, the graphical elements may be generated such that a first graphical element having a first luminosity is generated for a first selected object having a higher priority and a second graphical element having a second luminosity is generated for a second selected object having a lower priority, in which the first luminosity is greater than the second luminosity. In a manner similar to that described above with reference to size, shape and colour, variations in the luminosities of the graphical elements generated for at least some of the selected objects in the first avatar information may be used to visually indicate to the second user a relative priority for the graphical elements and thus a relative priority for the corresponding objects in the one or more images.

In embodiments of the disclosure, the processing circuitry 1230 is configured to generate the one or more images to include at least one graphical element indicative of the first avatar information in response to the selection of the first avatar, in which the graphical element comprises a plurality of textual elements indicative of the first avatar information. The avatar monitoring circuitry 1210 stores the first avatar information for the first avatar indicative of one or more of the selected object and, in response to the processing circuitry 1230 selecting the first avatar, a graphical element can be included one or more of the images generated by the processing circuitry 1230 for display to the second user, in which the graphical element comprises textual elements for visually representing at least some of the first avatar information. For example, in response to the selection of the first avatar, the graphical element can be included in the images to be displayed to the second user to indicate the identification information (e.g. a name and/or ID) associated with one or more selected objects in the first avatar information. The graphical element may take the form of a window positioned within a predetermined distance of the first avatar (e.g. above, below or next to the first avatar) in response to the selection of the first avatar by the processing circuitry 1230, where the window includes textual elements for one or more selected objects in the first avatar information. The textual elements may indicate, for at least one selected object in the first avatar information, at least one of: the identification information for the selected object; the object type information indicative of a type of the selected object; and the position information indicative of a position in the virtual reality environment for the selected object. In addition, in some cases the textual elements included in graphical element may also indicate the identification information for the first avatar (e.g. a name and/or an ID associated with the first avatar).

In embodiments of the disclosure, the processing circuitry 1230 is configured to generate the one or more images to include at least one graphical element indicative of the first avatar information in response to the selection of the first avatar, in which the graphical element is indicative of a most recently selected object in the first avatar information. In response to an object being selected, an entry in the first avatar information can be populated with information indicative of one or more properties associated with the selected object. The processing circuitry 1230 can therefore generate the one or more images responsive to the first avatar being selected, and at least one graphical element indicative of a most recently selected object in the first avatar information can be included in the images. The most recently selected object may in some examples be identified on the basis of the first time information, as discussed previously. In some examples, the avatar monitoring circuitry 1210 may associate a flag with a most recently populated entry (or a most recently updated entry) for the first avatar information, such that a most recently selected object can be identified on the basis of the flag. The processing circuitry 1230 can therefore generate the images to include a graphical element for a most recently selected object in dependence upon either the flag or the first time information. The graphical element can thus provide an indication of the latest (most recent) object to be selected by the first user's gaze point and can thus indicate to the second user a current object being viewed by the first user associated with the first avatar.

The graphical element for the most recently selected object may take the form of a window arranged with respect to the first avatar comprising one or more textual elements for indicating the identification information, object type information and/or position information for the most recently selected object. The window may be included in the one or more images at a position within a predetermined distance of the first avatar so that the second user understands that the window comprises information associated with the first avatar. Alternatively, the graphical element may take the form of a graphical object such as a circle or a sphere positioned proximate to (within a predetermined distance of) the most recently selected object (e.g. above, below or next to the most recently selected object). In some cases, two or more graphical elements may be provided for indicating the most recently selected object by displaying the window proximate to the first avatar and also the graphical object proximate to the most recently selected object.

In embodiments of the disclosure, the processing circuitry 1230 is configured to generate the one or more images to include the graphical element by adapting an appearance of a selected object in the virtual reality environment. The processing circuitry 1230 can adapt an appearance of one or more selected objects present in the one or more images generated for display to the second user responsive to the selection of the first avatar by the processing circuitry 1230. In some cases, the appearance of the selected object in the virtual reality environment may be adapted by adapting a colour of the selected object. A predetermined colour may be applied to an object to adapt the appearance of the object in response to the first avatar being selected so that the second user is informed by virtue of the predetermined colour that the object has previously been (or is currently being) viewed by the first user associated with the first avatar. For example, in a virtual reality environment comprising a plurality of avatars, the second user may select the first avatar using their gaze point and, in response to the selection of the first avatar, an appearance of one or more objects in the virtual reality environment may be adapted by applying the predetermined colour to the selected objects. Therefore, the second user can readily identify objects which have been viewed by the first user on the basis of the predetermined colour.

It will be appreciated that the processing circuitry 1230 can be configured to adapt an appearance of a plurality of selected objects in the virtual reality environment in dependence upon the priority rating so that different colours are applied to the respective objects to indicate a different priority for the respective objects, as discussed previously. In some cases, the appearance of the selected object in the virtual reality environment may be adapted by adapting a size and/or shape and/or luminosity in dependence upon the priority rating using the techniques discussed previously.

In embodiments of the disclosure, each graphical element indicative of the first avatar information has a predetermined colour. In a virtual reality environment comprising a plurality of avatars, each avatar having an associated user may have a corresponding colour that is used for presenting their avatar information. The first avatar may have a first predetermined colour (e.g. red) such that the one or more graphical elements indicative of the first avatar information comprise the first predetermined colour, and another avatar (e.g. a fifth avatar) may have a second predetermined colour (e.g. blue) such that the one or more graphical elements indicative of the fifth avatar information comprise the second predetermined colour. Consequently, for a virtual reality environment comprising a plurality of avatars, when a first avatar is selected by the processing circuitry 1230 a group of avatars previously targeted by the first user's gaze point can each have their appearance adapted so as to have a first predetermined colour and therefore the group of avatars associated with the first user can be indicated to the second user in the one or more images using the first predetermined colour.

Figure 13:
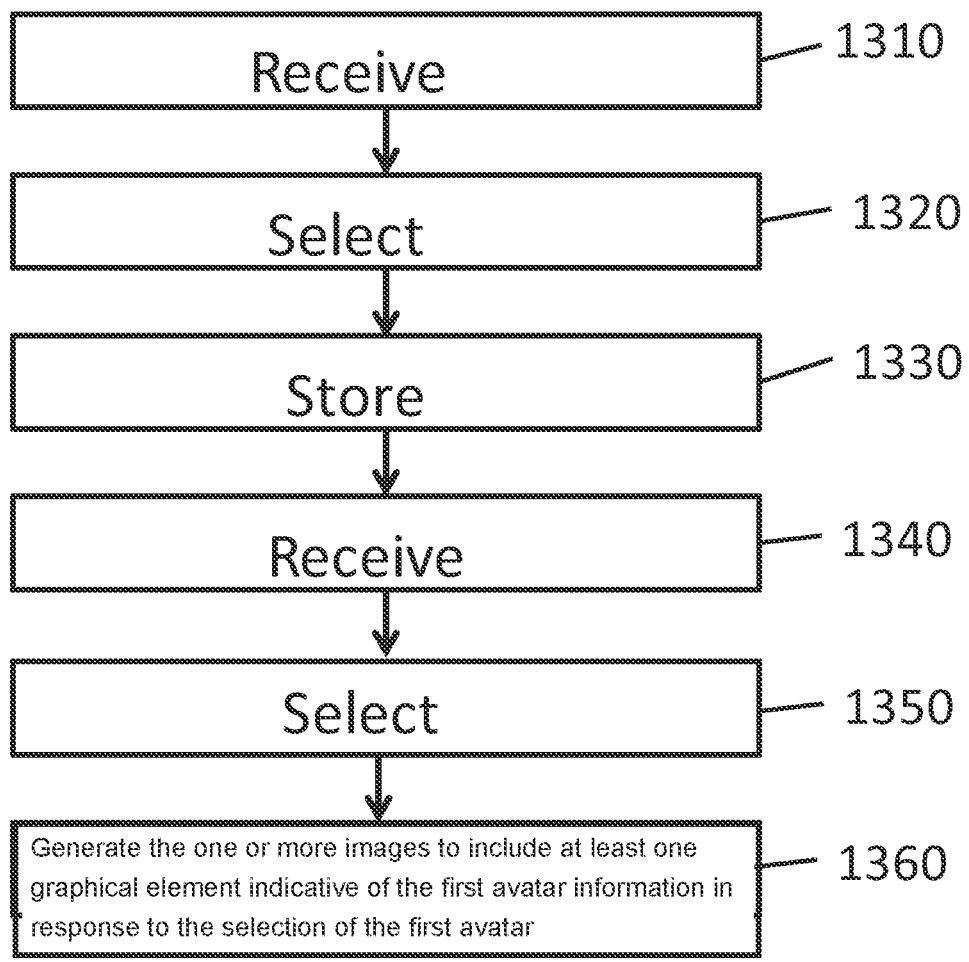
FIG. 13 is a schematic flowchart illustrating a data processing method.

Referring now to FIG. 13, in embodiments of the disclosure a data processing method comprises:

receiving (at a step 1310) gaze data for a first user associated with a first avatar in a virtual reality environment, the gaze data for the first user indicative of a gaze point for the first user with respect to the virtual reality environment;

selecting (at a step 1320) one or more objects in the virtual reality environment in dependence upon the gaze data for the first user;

storing (at a step 1330) first avatar information for the first avatar indicative of one or more of the selected objects;

receiving (at a step 1340) gaze data for a second user indicative of a gaze point for the second user with respect to the virtual reality environment;

selecting (at a step 1350) the first avatar in dependence upon the gaze point for the second user with respect to the first avatar; and generating (at a step 1360) one or more images for the virtual reality environment for display to the second user in response to the selection of the first avatar, the one or more images including at least one graphical element indicative of the first avatar information.

It will be appreciated that example embodiments can be implemented by computer software operating on a general purpose computing system such as a games machine. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A data processing apparatus, comprising:
   avatar monitoring circuitry to receive gaze data for a first user associated with a first avatar in a virtual reality environment, the gaze data for the first user indicative of a gaze point for the first user with respect to the virtual reality environment, in which the avatar monitoring circuitry is configured to select one or more objects in the virtual reality environment in dependence upon the gaze data for the first user and to store first avatar information for the first avatar indicative of one or more of the selected objects;
   input circuitry to receive gaze data for a second user indicative of a gaze point for the second user with respect to the virtual reality environment; and
   processing circuitry to generate images for the virtual reality environment for display to the second user, in which the processing circuitry is configured to:
   generate one or more of the images for the virtual reality environment to include the first avatar and select the first avatar in dependence upon whether the gaze point for the second user is within a predetermined distance of the first avatar in one or more of the images for the virtual reality environment; and
   generate one or more of the images including the first avatar to include at least one graphical element indicative of the first avatar information in response to the selection of the first avatar by the gaze point for the second user,
   wherein the first avatar information comprises one or more of:
   identification information for the first avatar;
   identification information for a selected object; and
   object type information indicative of a type of the selected object.

2. The data processing apparatus according to claim 1, in which the second user is associated with a second avatar in the virtual reality environment.

3. The data processing apparatus according to claim 1, in which the processing circuitry is configured to generate the one or more images for display to the second user using a virtual camera.

4. The data processing apparatus according to claim 1, in which the avatar monitoring circuitry is configured to select a given object in the virtual reality environment in dependence upon whether the gaze point for the first user is within a predetermined distance of the given object for a predetermined period of time.

5. The data processing apparatus according to claim 1, in which the avatar monitoring circuitry is configured to receive gaze data for each user associated with an avatar in the virtual reality environment and to store corresponding avatar information for the avatar, the virtual reality environment comprising a plurality of avatars.

6. The data processing apparatus according to claim 1, in which the one or more objects selected by the avatar monitoring circuitry comprises one or more avatars in the virtual reality environment.

7. The data processing apparatus according to claim 1, in which the first avatar information comprises
   position information indicative of a position in the virtual reality environment for the selected object.

8. The data processing apparatus according to claim 1, in which the first avatar information comprises at least one of:
   first time information indicative of a time associated with the selection by the avatar monitoring circuitry of the selected object; and
   second time information indicative of a period of time for which the gaze point for the first user is within a predetermined distance of the selected object.

9. The data processing apparatus according to claim 8, in which the avatar monitoring circuitry is configured to assign a priority rating to at least some of the selected objects in the first avatar information in dependence upon either the first time information or the second time information associated with the selected objects in the first avatar information.

10. The data processing apparatus according to claim 9, in which the processing circuitry is configured to generate the one or more images to include a predetermined number of graphical elements, in which the processing circuitry is configured to assign one of the graphical elements to one of the selected objects having an assigned priority rating in the first avatar information in dependence upon the priority ratings.

11. The data processing apparatus according to claim 9, in which the processing circuitry is configured to generate the one or more images to include at least one graphical element for each of the selected objects having an assigned priority rating in the first avatar information, in which the processing circuitry is configured to adjust at least one of a size, shape, colour and luminosity of a graphical element in dependence upon the priority rating.

12. The data processing apparatus according to claim 1, in which the graphical element comprises a plurality of textual elements indicative of the first avatar information.

13. The data processing apparatus according to claim 1, in which the graphical element is indicative of a most recently selected object in the first avatar information.

14. The data processing apparatus according to claim 1, in which the processing circuitry is configured to generate the one or more images to include the graphical element by adapting an appearance of a selected object in the virtual reality environment.

15. The data processing apparatus according to claim 14, in which each graphical element indicative of the first avatar information has a predetermined colour.

16. A system, comprising:
   the data processing apparatus, including:
   avatar monitoring circuitry to receive gaze data for a first user associated with a first avatar in a virtual reality environment, the gaze data for the first user indicative of a gaze point for the first user with respect to the virtual reality environment, in which the avatar monitoring circuitry is configured to select one or more objects in the virtual reality environment in dependence upon the gaze data for the first user and to store first avatar information for the first avatar indicative of one or more of the selected objects;

input circuitry to receive gaze data for a second user indicative of a gaze point for the second user with respect to the virtual reality environment; and processing circuitry to generate images for the virtual reality environment for display to the second user, in which the processing circuitry is configured to: (i) generate one or more of the images for the virtual reality environment to include the first avatar; (ii) select the first avatar in dependence upon whether the gaze point for the second user is within a predetermined distance of the first avatar in one or more of the images for the virtual reality environment; and (iii) generate one or more of the images including the first avatar to include at least one graphical element indicative of the first avatar information in response to the selection of the first avatar by the gaze point for the second user; and one of a head-mountable display (HMD) and a display unit to output the one or more images for display to the second user, wherein the first avatar information comprises one or more of:

identification information for the first avatar;

identification information for a selected object; and object type information indicative of a type of the selected object.

17. The system according to claim 16, comprising a server to receive a gaze data request from the data processing apparatus for the gaze data for the first user in response to the selection of the first avatar, in which the server is configured to transmit information indicative of the gaze data for the first user to the data processing apparatus in response to receiving the gaze data request.

18. The system according to claim 16, comprising another data processing apparatus to:

generate one or more images for the virtual reality environment for display to the first user;

receive a gaze data request from the data processing apparatus for the gaze data for the first user in response to the selection of the first avatar; and transmit information indicative of the gaze data for the first user to the data processing apparatus in response to receiving the gaze data request.

19. A data processing method, comprising:

receiving gaze data for a first user associated with a first avatar in a virtual reality environment, the gaze data for the first user indicative of a gaze point for the first user with respect to the virtual reality environment;

selecting one or more objects in the virtual reality environment in dependence upon the gaze data for the first user;

storing first avatar information for the first avatar indicative of one or more of the selected objects;

receiving gaze data for a second user indicative of a gaze point for the second user with respect to the virtual reality environment;

generating images for the virtual reality environment for display to the second user, including generating one or more of the images for the virtual reality environment to include the first avatar;

selecting the first avatar in dependence upon whether the gaze point for the second user is within a predetermined distance of the first avatar in one or more of the images for the virtual reality environment; and generating one or more of the images including the first avatar to include at least one graphical element indicative of the first avatar information in response to the selection of the first avatar by the gaze point for the second user, wherein the first avatar information comprises one or more of:

identification information for the first avatar;

identification information for a selected object; and object type information indicative of a type of the selected object.

20. A non-transitory, computer-readable storage medium containing computer software which, when executed by a computer, causes the computer to perform a data processing method by carrying out actions, comprising:

receiving gaze data for a first user associated with a first avatar in a virtual reality environment, the gaze data for the first user indicative of a gaze point for the first user with respect to the virtual reality environment;

selecting one or more objects in the virtual reality environment in dependence upon the gaze data for the first user;

storing first avatar information for the first avatar indicative of one or more of the selected objects;

receiving gaze data for a second user indicative of a gaze point for the second user with respect to the virtual reality environment;

generating images for the virtual reality environment for display to the second user, including generating one or more of the images for the virtual reality environment to include the first avatar;

selecting the first avatar in dependence upon whether the gaze point for the second user is within a predetermined distance of the first avatar in one or more of the images for the virtual reality environment; and generating one or more of the images including the first avatar to include at least one graphical element indicative of the first avatar information in response to the selection of the first avatar by the gaze point for the second user, selecting the first avatar in dependence upon the gaze point for the second user with respect to the first avatar; and generating one or more images for the virtual reality environment for display to the second user in response to the selection of the first avatar, the one or more images including at least one graphical element indicative of the first avatar information, wherein the first avatar information comprises one or more of:

identification information for the first avatar;

identification information for a selected object; and object type information indicative of a type of the selected object.

* * * * *